US012528164B2

(12) United States Patent
Sun et al.

(10) Patent No.: US 12,528,164 B2
(45) Date of Patent: Jan. 20, 2026

(54) NAIL GUN

(71) Applicant: Nanjing Chervon Industry Co., Ltd., Nanjing (CN)

(72) Inventors: Guangcheng Sun, Nanjing (CN); Rong Wang, Nanjing (CN); Wenjie Yang, Nanjing (CN); Hongbin Wang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 69 days.

(21) Appl. No.: 18/541,208

(22) Filed: Dec. 28, 2023

(65) Prior Publication Data

US 2024/0278401 A1 Aug. 22, 2024

(30) Foreign Application Priority Data

Feb. 16, 2023 (CN) ......................... 202310125638.7
Nov. 14, 2023 (CN) ......................... 202311517754.X
Nov. 14, 2023 (CN) ......................... 202311517837.9
Nov. 14, 2023 (CN) ......................... 202323069937.8

(51) Int. Cl.
*B25C 1/04* (2006.01)
*B25C 1/00* (2006.01)

(52) U.S. Cl.
CPC .............. *B25C 1/043* (2013.01); *B25C 1/001* (2013.01)

(58) Field of Classification Search
CPC ........... B25C 1/043; B25C 1/001; B25C 1/06; B25C 1/047; B25C 1/04; B25C 1/041; B25C 1/008; B25D 9/08; B25D 2250/181; B25D 9/04
See application file for complete search history.

(56) References Cited

U.S. PATENT DOCUMENTS 8,079,504 B1 12/2011 Pedicini
2012/0286014 A1 11/2012 Pedicini
2019/0143498 A1 * 5/2019 Weber ..................... B25C 1/005 227/140

FOREIGN PATENT DOCUMENTS

EP 4119298 B1 6/2024

* cited by examiner

*Primary Examiner* — Veronica Martin
(74) *Attorney, Agent, or Firm* — Greenberg Traurig, LLP

(57) ABSTRACT

A nail gun includes: a housing; a cylinder assembly at least partially disposed in the housing; a magazine assembly for storing nails; and a firing assembly used for striking a nail and at least partially disposed in the cylinder assembly. The cylinder assembly includes a first cylinder and a second cylinder. The first cylinder includes a first cylinder and at least part of the second cylinder is disposed in the first cylinder cavity. The nail gun further includes a first piston, disposed at least in part in the first cylinder cavity, capable of reciprocating along the direction of the first axis in the first cylinder cavity. The first piston is configured to form an air intake passage with part of the outer wall of the second cylinder, and a gas is capable of passing through the air intake passage and entering the first cylinder cavity.

20 Claims, 19 Drawing Sheets

NAIL GUN

RELATED APPLICATION INFORMATION

This application claims the benefit under 35 U.S.C. § 119(a) of Chinese Patent Application No. CN 202310125638.7, filed on Feb. 17, 2023, Chinese Patent Application No. CN 202311517837.9, filed on Nov. 14, 2023, Chinese Patent Application No. CN 202311517754.X, filed on Nov. 14, 2023, and Chinese Patent Application No. CN 202323069937.8, filed on Nov. 14, 2023, which applications are incorporated herein by reference in their entireties.

TECHNICAL FIELD

The present application relates to a power tool and, in particular, to a nail gun.

BACKGROUND

As a nailing tool, a nail gun produces an impact force on a nail, thereby impacting the nail into a workpiece. Existing nail guns in the market may be classified as mechanical nail guns and cylinder-type nail guns according to a principle manner. The cylinder-type nail guns may be classified as nail guns with single-cylinder structures or nail guns with double-cylinder structures according to the number of cylinders. The manufacturing process of an existing double-cylinder structure is complicated, and the cost of the double-cylinder structure is relatively high.

SUMMARY

The present application provides a nail gun. The nail gun includes: a housing formed with an accommodating space; a cylinder assembly at least partially disposed in the housing; a magazine assembly for storing nails; and a firing assembly used for striking a nail and at least partially disposed in the cylinder assembly. The cylinder assembly includes a first cylinder and a second cylinder, where the first cylinder includes a first cylinder cavity extending along the direction of a first axis, and at least part of the second cylinder is disposed in the first cylinder cavity. The nail gun further includes a first piston, where at least part of the first piston is disposed in the first cylinder cavity, and the first piston is capable of reciprocating along the direction of the first axis in the first cylinder cavity. The first piston is provided with an air intake passage, where an external gas outside the cylinder assembly is capable of entering the first cylinder cavity through the air intake passage. The air intake passage includes an air intake hole, where the external gas is capable of entering the air intake passage through the air intake hole, and the air intake hole is disposed on a sidewall surface of the first piston.

In some examples, the air intake passage further includes an air outlet hole, where a gas in the air intake passage can leave the air intake passage through the air outlet hole and enter the first cylinder cavity.

In some examples, the air outlet hole and the air intake hole are disposed on different wall surfaces of the first piston.

In some examples, the first piston is configured such that when the first piston reciprocates along the direction of the first axis, at least part of the air intake passage can leave the first cylinder cavity, and when the air intake hole leaves the first cylinder cavity, the air intake hole can allow the external gas to enter the air intake passage through the air intake hole.

In some examples, the air intake hole can be closed by the inner wall of the first cylinder when entering the first cylinder cavity so that the external gas is prevented from entering the air intake passage through the air intake hole.

In some examples, the air intake passage is configured to have an L-shaped structure.

In some examples, the first piston is provided with at least two air intake passages.

In some examples, all of the air intake passages are symmetrically disposed around the second cylinder.

In some examples, the second cylinder includes a second cylinder cavity extending along the direction of a second axis, where the first axis is parallel to the second axis; and the firing assembly includes a second piston disposed in the second cylinder cavity, and the second piston is capable of reciprocating along the direction of the second axis in the second cylinder cavity.

In some examples, the cylinder assembly further includes a communication member for communicating with the first cylinder cavity and the second cylinder cavity, where a gas in the first cylinder cavity can enter the second cylinder cavity through the communication member.

In some examples, the first cylinder includes a first end and a second end, where the communication member is disposed at the first end, the second end is disposed opposite to the first end, and the second end is configured to be an opening.

In some examples, an air outlet port faces the communication member.

In some examples, an air intake port faces away from the first axis.

In some examples, the first piston is disposed in the first cylinder cavity.

In some examples, the cylinder assembly further includes a stopper member disposed at the second end, where the stopper member is used for preventing at least part of the first piston from leaving the first cylinder cavity.

In some examples, the firing assembly further includes an insertion member which can prevent the external gas from entering the first cylinder cavity from the air outlet hole, where a first insertion end of the insertion member is connected to the communication member, and a second insertion end of the insertion member can be inserted into the air intake passage from the air outlet hole.

In some examples, the air intake passage further includes a fixed slot disposed between the air intake hole and the air outlet hole. The first piston includes an insertion rod sealing member at least partially accommodated in the fixed slot. The insertion member further includes an intermediate portion disposed between the first insertion end and the second insertion end, where the intermediate portion is configured to be capable of fitting closely around the insertion rod sealing member to prevent the external gas from entering the first cylinder cavity through the air intake passage.

In some examples, the diameter of the second insertion end is less than the diameter of the intermediate portion, and the second insertion end cannot fit closely around the insertion rod sealing member so that the external gas is allowed to enter the first cylinder cavity through the air intake passage.

In some examples, the first cylinder includes an air valve assembly at least partially disposed in the air intake passage, where the air valve assembly can allow the external gas to enter the first cylinder cavity through the air intake passage and prevent the external gas from entering the first cylinder cavity through the air intake passage.

In some examples, the air valve assembly is configured such that when the first piston moves toward the first end along the first axis, the air valve assembly can prevent the external gas from entering the first cylinder cavity through the air intake passage.

The present application provides a nail gun. The nail gun includes: a housing formed with an accommodating space; a cylinder assembly at least partially disposed in the housing; a magazine assembly for storing nails; and a firing assembly used for striking a nail and at least partially disposed in the cylinder assembly. The cylinder assembly includes a first cylinder and a second cylinder, where the first cylinder includes a first cylinder cavity extending along the direction of a first axis, and at least part of the second cylinder is disposed in the first cylinder cavity. The nail gun further includes a first piston, where at least part of the first piston is disposed in the first cylinder cavity, the first piston is capable of reciprocating along the direction of the first axis in the first cylinder cavity, the first piston is configured to be capable of forming an air intake passage with part of the outer wall of the second cylinder, and a gas is capable of passing through the air intake passage and entering the first cylinder cavity.

In some examples, the nail gun further includes a first sealing member, where the outer side of the first sealing member fits snugly around the first piston, and the inner side of the first sealing member fits snugly around part of the outer wall of the second cylinder. The first piston is capable of driving the first sealing member to move on the surface of the outer wall of the second cylinder. A slot is disposed on part of the surface of the outer wall of the second cylinder. The first cylinder is configured such that when the first sealing member is located in the slot, the air intake passage is formed between the first piston and the surface of the outer wall of the second cylinder and the gas is capable of passing through the air intake passage.

In some examples, the first piston is provided with a first accommodating groove for accommodating part of the first sealing member.

In some examples, the firing assembly further includes a second sealing member, where the inner side of the second sealing member fits snugly around the first piston, and the outer side of the second sealing member is capable of fitting snugly around the inner wall of the first cylinder. The first piston is capable of driving the second sealing member to slide on the surface of the inner wall of the first cylinder. The first cylinder is configured such that when the first sealing member moves to the position of the slot, the first sealing member forms part of the air intake passage with the surface of the outer wall of the second cylinder.

In some examples, the first piston is provided with a second accommodating groove for accommodating part of the second sealing member.

In some examples, the first sealing member and/or the second sealing member are O-shaped sealing rings.

In some examples, the first sealing member and/or the second sealing member are X-shaped sealing rings.

In some examples, the second cylinder includes a second cylinder cavity extending along the direction of a second axis, where the first axis is parallel to the second axis; and the firing assembly includes a second piston disposed in the second cylinder cavity, and the second piston is capable of reciprocating along the direction of the second axis in the second cylinder cavity.

In some examples, the depth of the slot is 1 mm to 5 mm.

In some examples, at least two slots are disposed on part of the surface of the outer wall of the second cylinder.

In some examples, all of the slots are symmetrically disposed around the second axis.

In some examples, when the first sealing member is located in the slot, a spacing between the first sealing member and the surface of the outer wall of the second cylinder is greater than a minimum gap between the first piston and the surface of the outer wall of the second cylinder.

The present application provides a nail gun. The nail gun includes: a housing formed with an accommodating space; a cylinder assembly at least partially disposed in the housing; a magazine assembly for storing nails; and a firing assembly used for striking a nail and at least partially disposed in the cylinder assembly. The cylinder assembly includes a first cylinder and a second cylinder, where the first cylinder includes a first cylinder cavity extending along the direction of a first axis, and at least part of the second cylinder is disposed in the first cylinder cavity. The nail gun further includes: a first piston, where at least part of the first piston is disposed in the first cylinder cavity, and the first piston is capable of reciprocating along the direction of the first axis in the first cylinder cavity; and a first sealing member, where the outer side of the first sealing member fits snugly around the first piston, and the inner side of the first sealing member fits snugly around part of the outer wall of the second cylinder. The first piston is capable of driving the first sealing member to move on the surface of the outer wall of the second cylinder, and distances between the first sealing member and the surface of the outer wall of the second cylinder are different from each other.

In some examples, in a radial direction, the distance between the first sealing member and part of the surface of the outer wall of the second cylinder is 0, and the distance between the first sealing member and part of the surface of the outer wall of the second cylinder is greater than 0.

In some examples, in a radial direction, a slot is disposed on part of the surface of the outer wall of the second cylinder, where the distance between the first sealing member and the slot of the second cylinder is greater than 0.

The present application provides a nail gun. The nail gun includes: a housing formed with an accommodating space; a cylinder assembly at least partially disposed in the housing; a magazine assembly for storing nails; and a firing assembly used for striking a nail and at least partially disposed in the cylinder assembly. The cylinder assembly includes a first cylinder and a second cylinder, where the first cylinder includes a first cylinder cavity extending along the direction of a first axis, and at least part of the second cylinder is disposed in the first cylinder cavity. The first cylinder includes a first rear cylinder body and a first front cylinder body, where the inner diameter of the first front cylinder body is greater than the inner diameter of the first rear cylinder body. The first cylinder cavity extends along the direction of the first axis, and at least part of the second cylinder is disposed in the first cylinder cavity. The first cylinder cavity includes the cavity of the first rear cylinder body and the cavity of the first front cylinder body. The nail gun further includes a first piston, where at least part of the first piston is disposed in the first cylinder cavity, and the first piston is capable of reciprocating along the direction of the first axis in the first cylinder cavity. The firing assembly includes a second sealing member, where the inner side of the second sealing member fits snugly around the first piston, the outer side of the second sealing member is capable of fitting snugly around the inner wall of the first rear cylinder body, and the first cylinder is configured such that the first piston forms an air intake passage with the surface of the inner wall of the first rear cylinder body and the gas is capable of passing through the air intake passage when the second sealing member is located in the cavity of the first front cylinder body, and the second sealing member abuts against the surface of the inner wall of the first rear cylinder body when the second sealing member is located in the cavity of the first rear cylinder body.

In some examples, when the second sealing member is located in the cavity of the first front cylinder body, the gap distance between the second sealing member and the surface of the inner wall of the first front cylinder body is greater than the gap between the first piston and the surface of the inner wall of the first rear cylinder body.

In some examples, the housing is formed with a mounting base for mounting the cylinder assembly, where the mounting base includes an air intake opening, an external gas outside the cylinder assembly can enter the housing through the air intake opening, and the external gas can pass through the air intake passage and enter the first rear cylinder body.

In some examples, the first piston is provided with a second accommodating groove for accommodating part of the second sealing member.

In some examples, the first cylinder further includes a first sealing member, where the outer side of the first sealing member fits snugly around the first piston, and the inner side of the first sealing member fits snugly around part of the outer wall of the second cylinder. The first piston is capable of driving the first sealing member to slide on the surface of the outer wall of the first front cylinder body.

In some examples, the first piston is provided with a first accommodating groove for accommodating part of the first sealing member.

In some examples, the first sealing member and/or the second sealing member are O-shaped sealing rings.

In some examples, the first sealing member and/or the second sealing member are X-shaped sealing rings.

In some examples, the difference between the inner diameter of the first front cylinder body and the inner diameter of the first rear cylinder body ranges from 0.5 mm to 15 mm.

In some examples, the length of the first front cylinder body ranges from 25 mm to 70 mm.

In some examples, the length of the first rear cylinder body ranges from 55 mm to 80 mm.

The present application provides a nail gun. The nail gun includes: a housing formed with an accommodating space; a cylinder assembly at least partially disposed in the housing; a magazine assembly for storing nails; and a firing assembly used for striking a nail and at least partially disposed in the cylinder assembly. The cylinder assembly includes a first cylinder and a second cylinder, where the first cylinder includes a first cylinder cavity extending along the direction of a first axis, and at least part of the second cylinder is disposed in the first cylinder cavity. The first cylinder includes a first rear cylinder body and a first front cylinder body, where the inner diameter of the first front cylinder body is greater than the inner diameter of the first rear cylinder body. The first cylinder cavity extends along the direction of the first axis, and at least part of the second cylinder is disposed in the first cylinder cavity. The first cylinder cavity includes the cavity of the first rear cylinder body and the cavity of the first front cylinder body. The nail gun further includes a first piston, where at least part of the first piston is disposed in the first cylinder cavity, and the first piston is capable of reciprocating along the direction of the first axis in the first cylinder cavity. The firing assembly includes a second sealing member, where the inner side of the second sealing member fits snugly around the first piston, the outer side of the second sealing member is capable of fitting snugly around the inner wall of the first rear cylinder body, and the first cylinder is configured such that the gap distance between the second sealing member and the surface of the inner wall of the first front cylinder body is greater than the gap between the first piston and the surface of the inner wall of the first rear cylinder body when the second sealing member is located in the cavity of the first front cylinder body.

DETAILED DESCRIPTION

Figure 1:
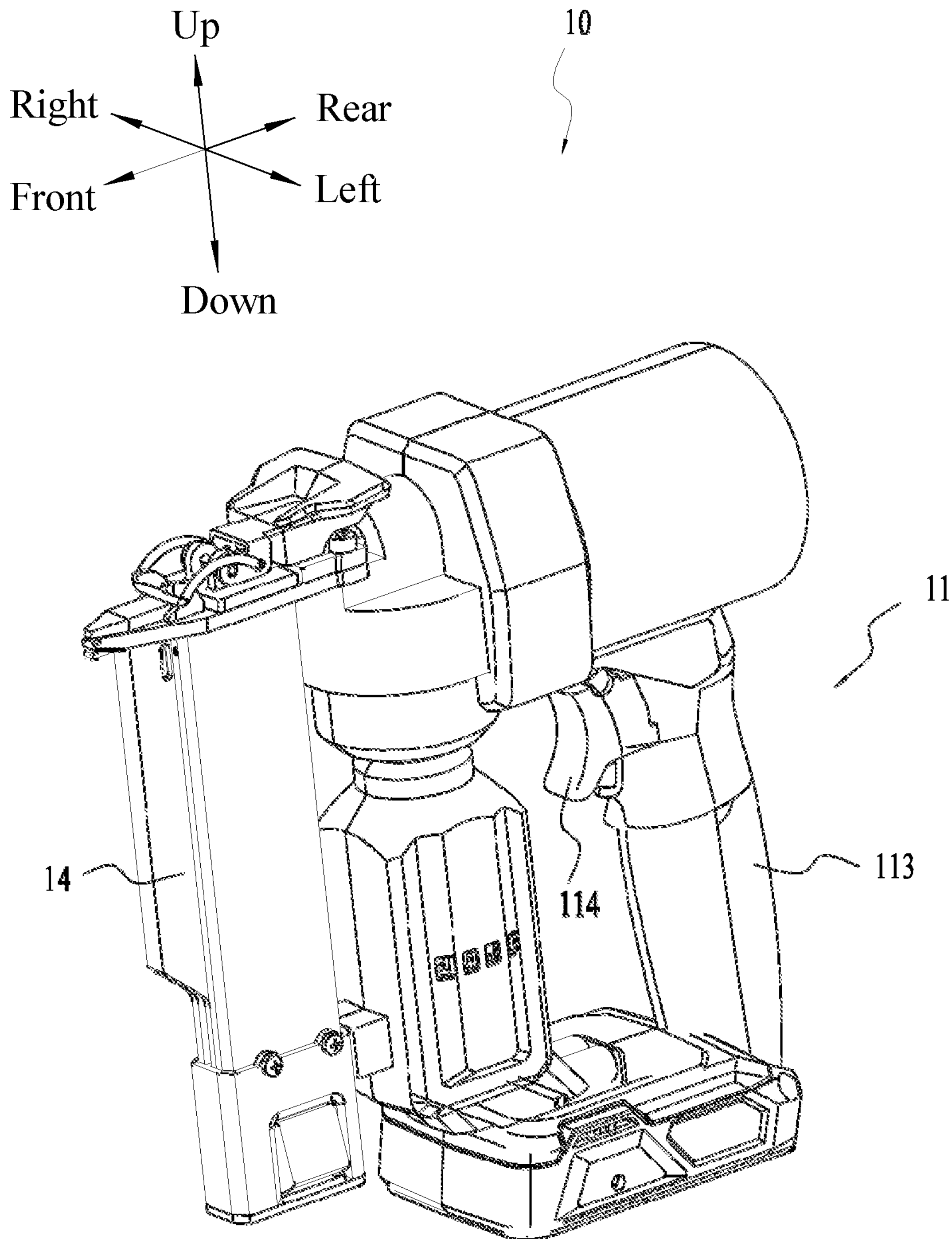
FIG. 1 is a perspective view of a nail gun according to an example of the present application.

Before any examples of this application are explained in detail, it is to be understood that this application is not limited to its application to the structural details and the arrangement of components set forth in the following description or illustrated in the above drawings.

In this application, the terms “comprising”, “including”, “having” or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase “comprising a . . . ” does not preclude the presence of additional identical elements in the process, method, article, or device comprising that element.

In this application, the term “and/or” is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

FIG. 1 illustrates a nail gun 10 as an example in the present application. In this specification, front, rear, left, right, up, and down are described as directions shown in FIG. 1. Specifically, when the nail gun 10 is operated by a user, the direction in which a nail is shot off is defined as the front direction, and the extension direction of a magazine assembly is defined as an up and down direction.

Figure 2:
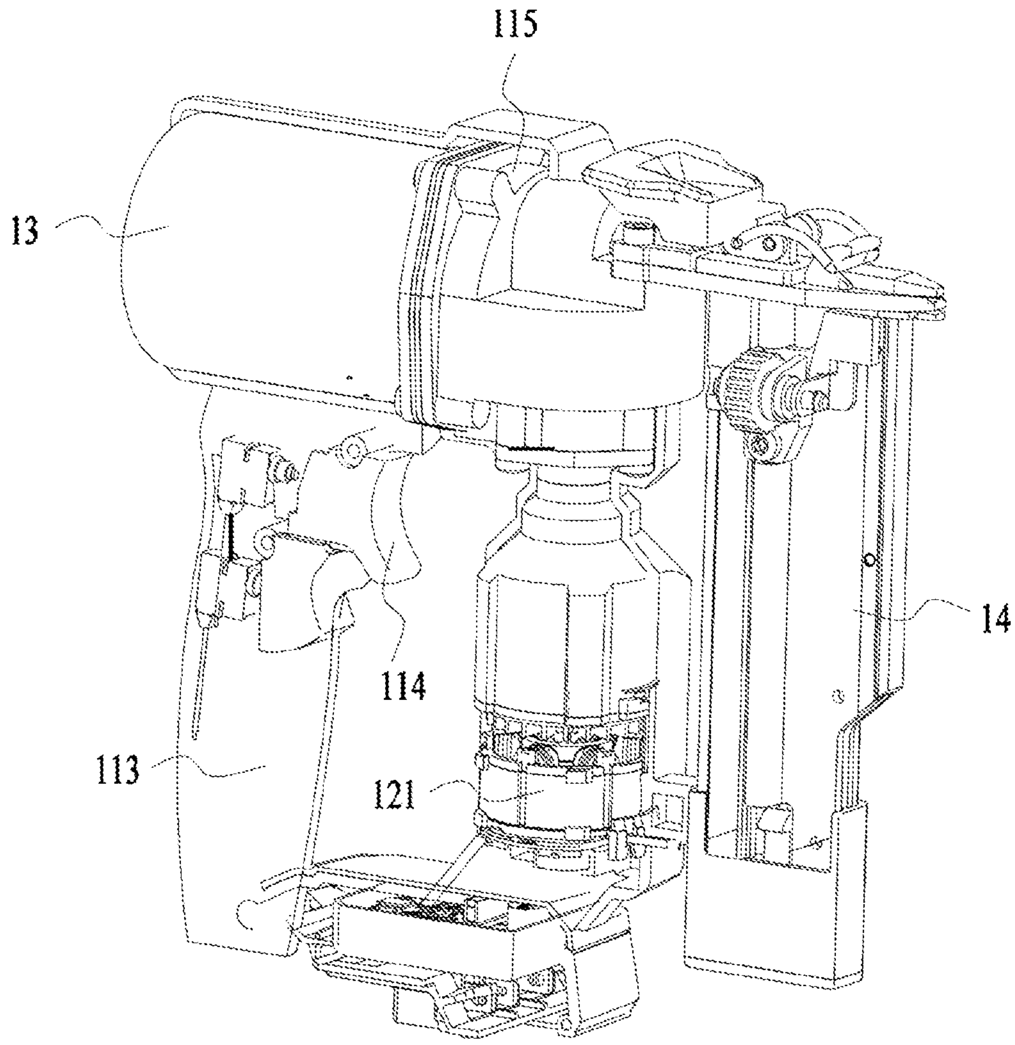
FIG. 2 is a perspective view of the nail gun in FIG. 1 with part of a housing removed.
Figure 3:
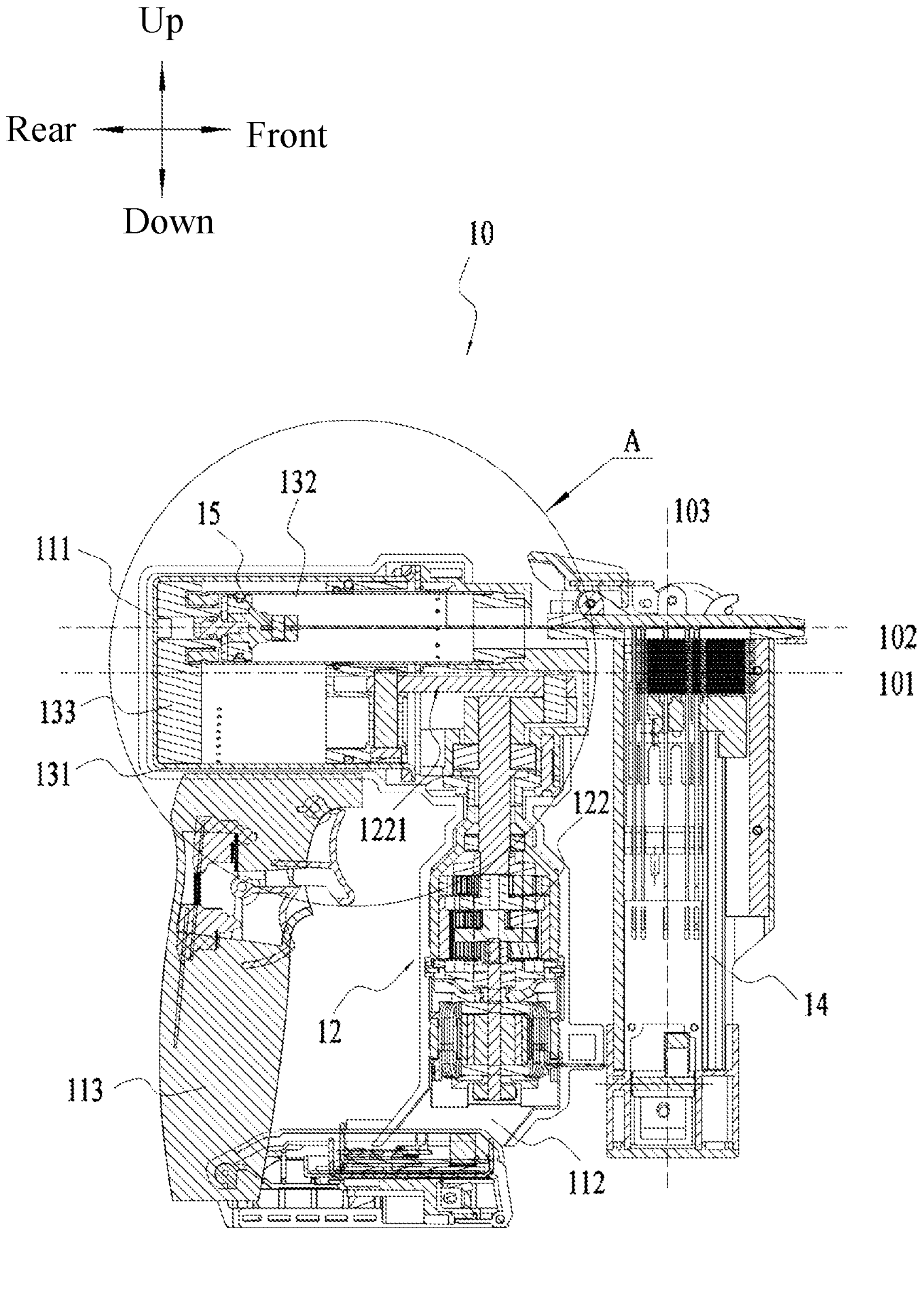
FIG. 3 is a sectional view of the nail gun in FIG. 1 from an angle of view.

Referring to FIGS. 1 to 3, the nail gun 10 includes a housing 11, a power output assembly 12, a cylinder assembly 13, a magazine assembly 14, and a firing assembly 15.

The housing 11 is formed with a first accommodating space 111 and a second accommodating space 112, where the cylinder assembly 13 is disposed in the first accommodating space 111, and the power output assembly 12 is disposed in the second accommodating space 112. The housing 11 is further formed with a handle 113 which can be held by the user. A power interface is connected to an end of the handle 113 and is configured to access a direct or alternating current power supply, for example, a direct current battery pack (not shown in the figure). A main switch 114 is disposed on the handle 113, and the user controls, by using the main switch 114, the nail gun 100 to start or stop. In this example, the housing 11 is further formed with a mounting base 115 for mounting the cylinder assembly 13. The mounting base 115 is disposed at the other end of the handle 113 connected to the power interface.

The power output assembly 12 includes a prime mover 121 and a transmission apparatus 122. The prime mover 121 is specifically an electric motor in this implementation. The transmission apparatus 122 is disposed between the prime mover 121 and the cylinder assembly 13. The transmission apparatus 122 may specifically include a deceleration assembly and a connecting rod assembly. The deceleration assembly may specifically include a multi-stage planet gear system, and the connecting rod assembly includes a drive rod 1221 for outputting power.

Figure 4:
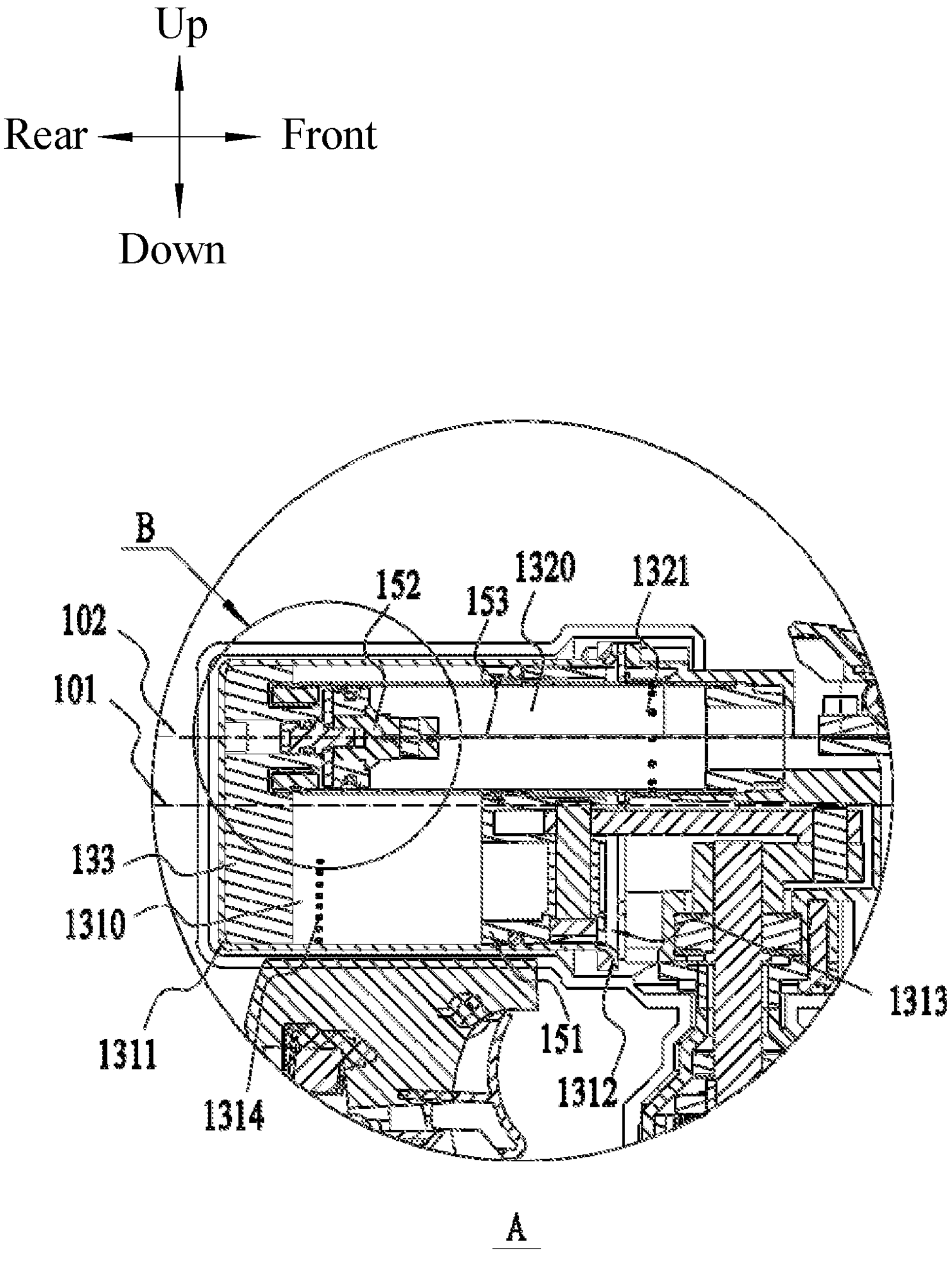
FIG. 4 is a partial enlarged view of a region A in FIG. 3.
Figure 5:
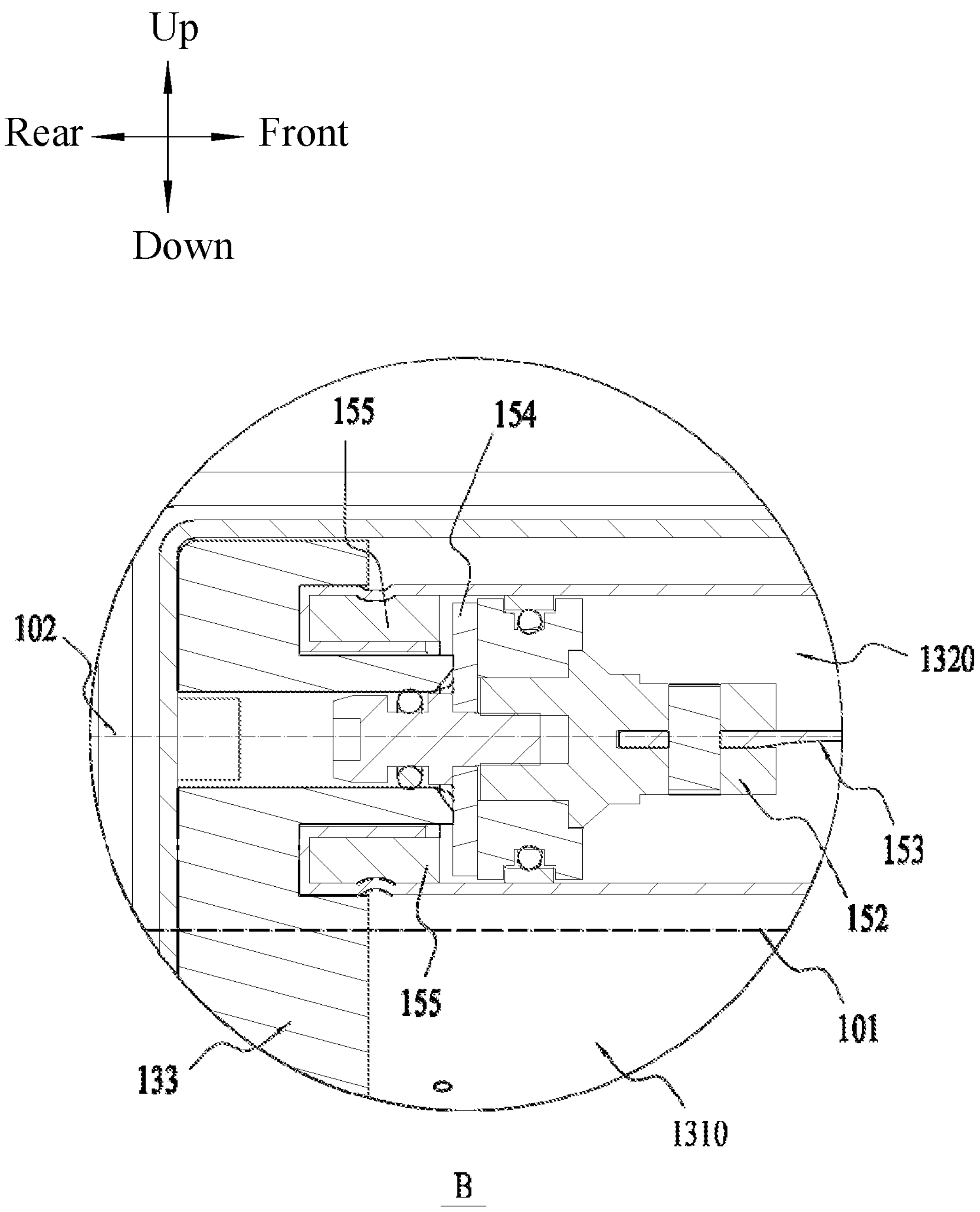
FIG. 5 is a partial enlarged view of a region B in FIG. 4.

As shown in FIGS. 3 to 5, the cylinder assembly 13 is disposed in the first accommodating space 111 and includes a first cylinder 131 and a second cylinder 132. The second cylinder 132 is partially or completely disposed in the first cylinder 131. The first cylinder 131 includes a first cylinder cavity 1310 extending along the direction of a first axis 101, and the second cylinder 132 is partially or completely disposed in the first cylinder cavity 1310. The second cylinder 132 includes a second cylinder cavity 1320 extending along the direction of a second axis 102, where the first axis 101 is parallel to the second axis 102. In some examples, the cylinder assembly 13 further includes a communication member 133 for communicating with the first cylinder cavity 1310 and the second cylinder cavity 1320, where a gas in the first cylinder cavity 1310 can enter the second cylinder cavity 1320 through the communication member 133. The first cylinder 131 includes a first end 1311 and a second end 1312 which are disposed opposite to each other, where the communication member 133 is disposed at the first end 1311, and a first cylinder opening 1313 is disposed at the second end 1312.

The magazine assembly 14 is disposed in the direction of a third axis 103 perpendicular to the first axis 101. The magazine assembly 14 is used for accommodating nails and is connected to the firing assembly 15.

The firing assembly 15 is disposed in the cylinder assembly 13 and includes a first piston 151, a second piston 152, and a firing pin 153. The first piston 151 is partially or completely disposed in the first cylinder cavity 1310. The second piston 152 is disposed in the second cylinder cavity 1320. One end of the drive rod 1221 is connected to the first piston 151 and can push, under the rotation of the prime mover 121, the first piston 151 to reciprocate along the direction of the first axis 101 in the first cylinder cavity 1310 The second piston 152 can reciprocate along the direction of the second axis 102 in the second cylinder cavity 1320. The firing pin 153 is fixedly connected to the second piston 152, and the second piston 152 is connected to the firing pin 153 and reciprocates along the direction of the second axis 102 in the second cylinder cavity 1320. The user fills the nails into the magazine assembly 14, and the second piston 152 pushes the firing pin 153 to move and drive a nail out. The firing assembly 15 further includes an iron sheet 154 and a magnet 155. The iron sheet 154 is disposed on the side of the second piston 152 facing the communication member 133. The magnet 155 is disposed on the side of the communication member 133 facing the second piston 152. The iron sheet 154 and the magnet 155 are attracted to each other to fix the second piston 152. In another example, the magnet 155 may be disposed on the side of the second piston 152 facing the communication member 133, and the iron sheet 154 may be disposed on the side of the communication member 133 facing the second piston 152.

As shown in FIGS. 3 to 5, the present application provides an example of a cylinder assembly. When the drive rod 1221 pushes the first piston 151 to move from front to rear along the direction of the first axis 101 in the first cylinder cavity 1310, the gas in the first cylinder cavity 1310 enters the second cylinder cavity 1320 through the communication member 133. As the first piston 151 gradually approaches the communication member 133, the air pressure borne by the second piston 152 also gradually increases. When the air pressure borne by the second piston 152 reaches a predetermined threshold, the second piston 152 overcomes the attraction of the magnet and moves from rear to front under the action of the air pressure, thereby pushing the firing pin 153 to move forward and strike the nail.

The surface of the second cylinder 132 may be provided with second cylinder holes 1321. When the second piston 152 moves forward and crosses the second cylinder holes 1321 under the push of the air pressure, the gas may leave the second cylinder cavity 1320 through the second cylinder holes 1321. After the second piston 152 crosses the second cylinder holes 1321, the first piston 151 may move from rear to front under the push of the drive rod 1221, and at the same time, the second piston 152 is driven by the air pressure to move from front to rear. The surface of the first cylinder 131 may be provided with first cylinder holes 1314. When the first piston 151 crosses the first cylinder holes 1311, an external gas may enter the first cylinder cavity 1310 through the first cylinder holes 1314. After the external gas enters the first cylinder cavity 1310, the first piston 151 may move from front to rear in the first cylinder cavity 1310 under the push of the drive rod 1221, and at the same time, the second piston 152 is pushed by the air pressure to overcome the attraction of the magnet 155 and move from rear to front, thereby pushing the firing pin 153 to move forward and strike the nail. With the preceding cycle, the nail gun 10 can continuously shoot off the nails.

The cylinder assembly 13 in the preceding example implements the flow of the gas in the manner of drilling holes on the surface of the first cylinder 131. In this solution, the holes need to be punched on the formed cylinders. Therefore, the structural strength of the cylinders is reduced, a cost is increased, and the holes may be blocked during the use of the user.

The present application provides multiple technical solutions with which the technical problems of the first cylinder 131 in the first example described above can be solved. According to these technical solutions, no hole needs to be punched on the first cylinder 131 so that the structural strength of the cylinder is enhanced, the cost for punching the holes is saved, and the possibility is avoided that the holes are blocked.

Figure 6:
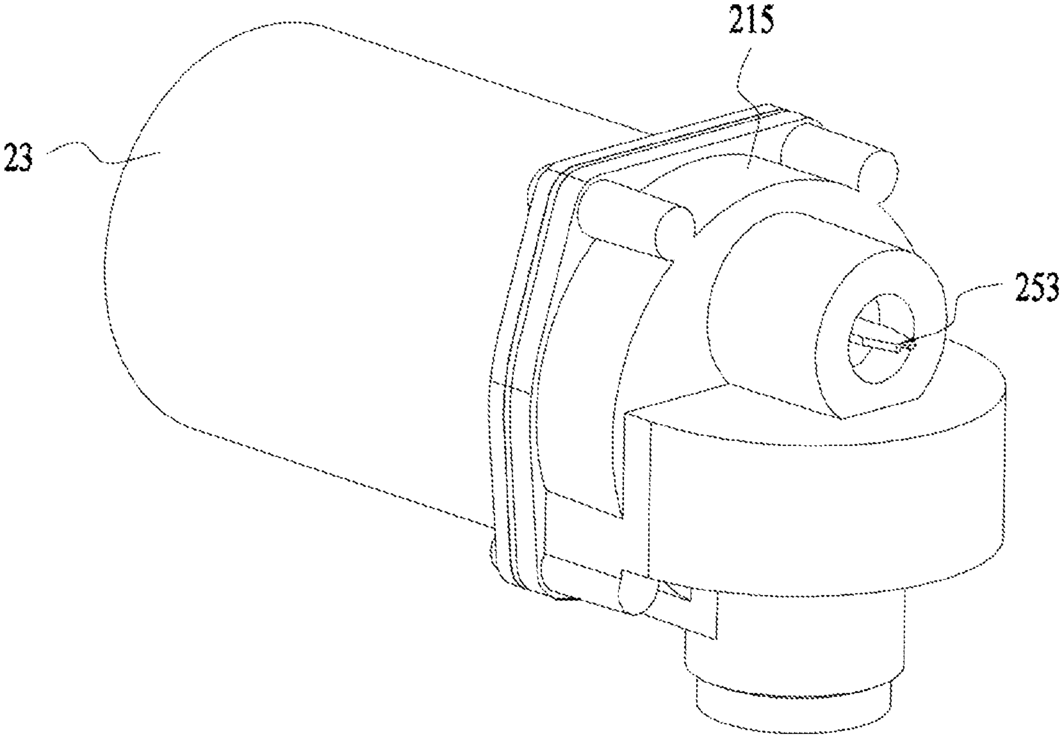
FIG. 6 is a perspective view of a partial structure of a nail gun according to an example of the present application.
Figure 7:
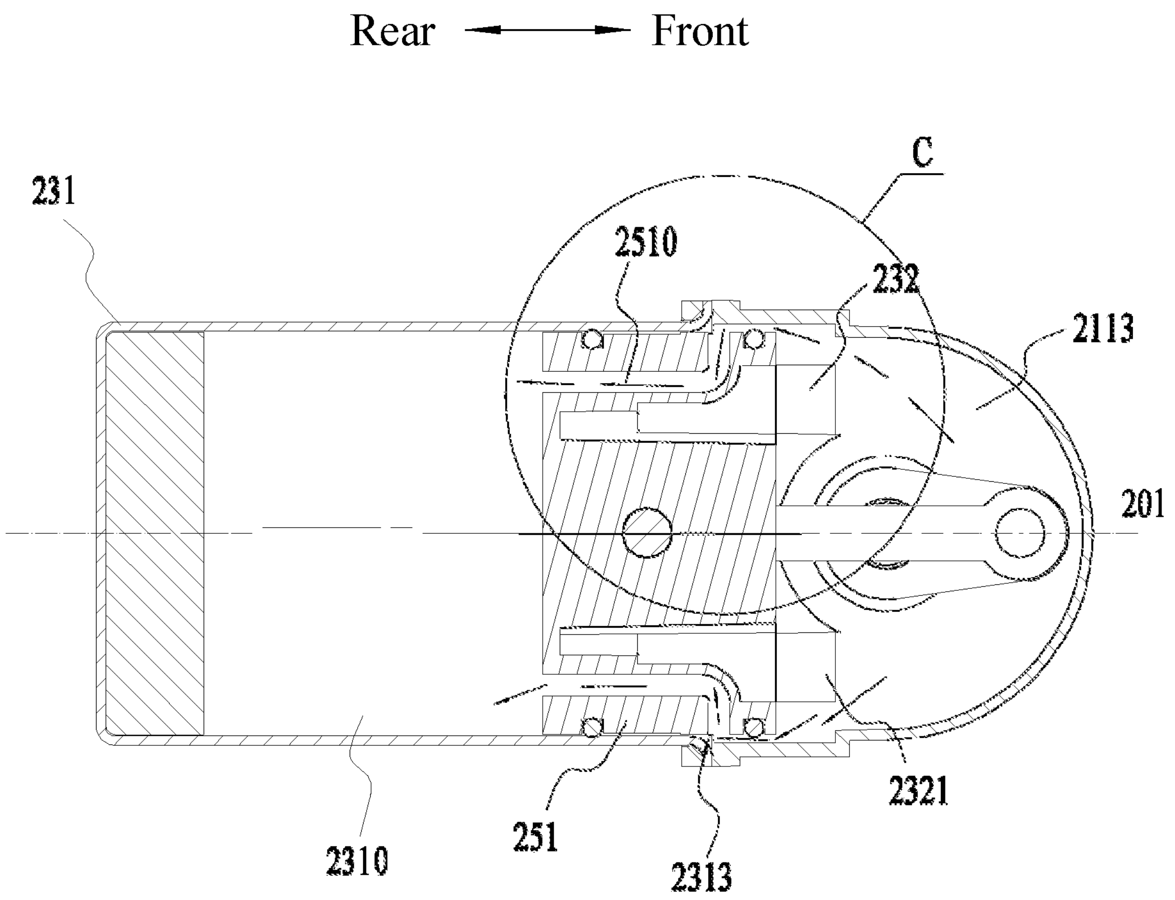
FIG. 7 is a sectional view of the partial structure of the nail gun in FIG. 6 from an angle of view.
Figure 8:
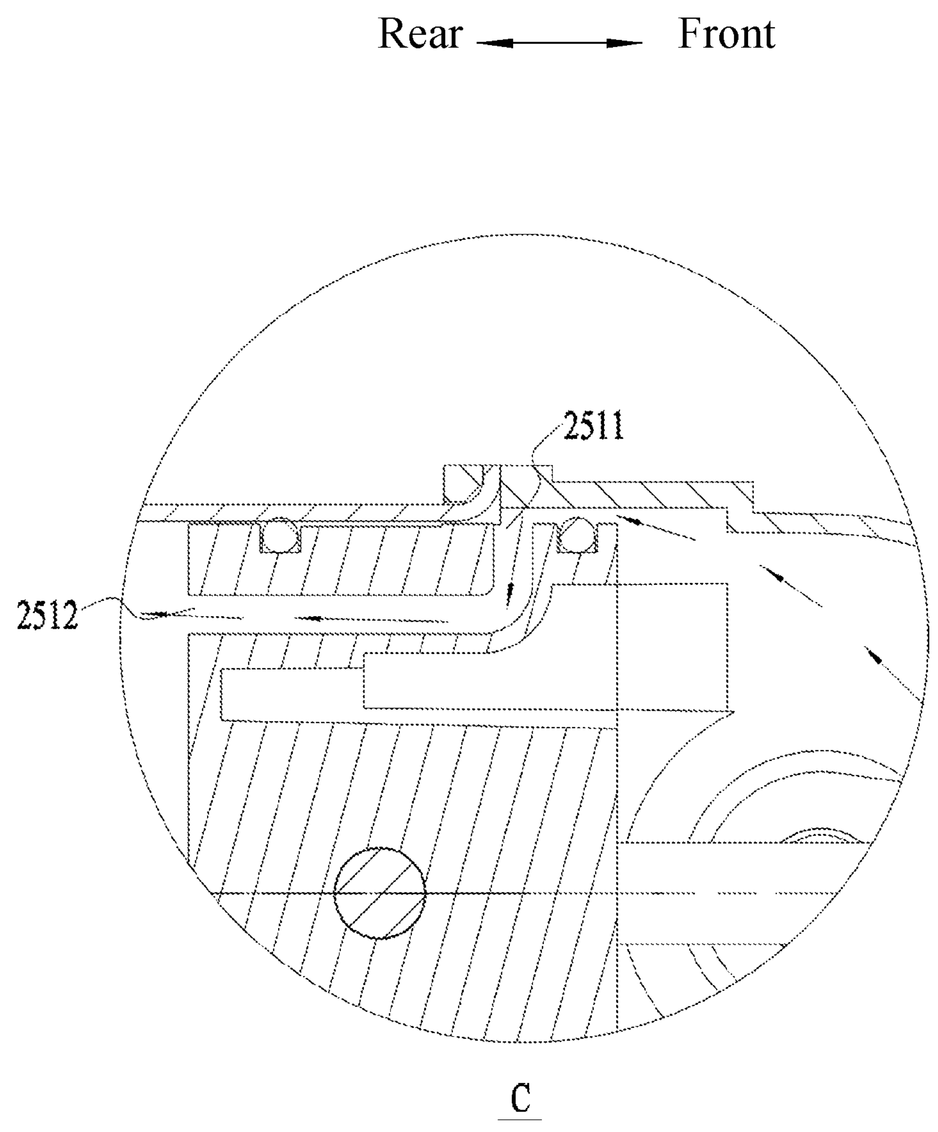
FIG. 8 is a partial enlarged view of a region C in FIG. 6.

As shown in FIGS. 6 to 8, as a second example of the cylinder assembly, the combination of a cylinder assembly 23 and a firing assembly 25 is provided by the present application. For ease of description, in this example, the difference between this example and the preceding example is mainly described, and the same reference numeral is used for a component which is the same as or similar to that in the preceding example. The content of the preceding example which is compatible with this example is applicable to this example.

The cylinder assembly 23 is mounted on a mounting base 215, and a firing pin 253 is disposed in the cylinder assembly 23. The cylinder assembly 23 includes a first cylinder 231 and a second cylinder 232. Part of the second cylinder 232 is disposed in the first cylinder 231, and the second cylinder 232 further includes a protruding portion 2321 which protrudes from the first cylinder cavity 2310. A first accommodating space includes a third accommodating space 2113 which accommodates the protruding portion 2321. The third accommodating space 2113 is part of the first accommodating space, communicates with the first cylinder cavity 2310 through a first cylinder opening 2313, and can communicate with external air. At least part of a first piston 251 may reciprocate in the first cylinder cavity 2310 and the third accommodating space 2113.

An air intake passage 2510 is disposed in the first piston 251, where an external gas outside the cylinder assembly 23 can enter the first cylinder cavity 2310 through the air intake passage 2510. In some examples, the first piston 251 may be provided with two or more air intake passages 2510, and all of the air intake passages 2510 may be symmetrically disposed around the second cylinder 232, that is, all of the air intake passages 2510 may be symmetrically disposed around the second axis.

The air intake passage 2510 includes an air intake hole 2511 and an air outlet hole 2512. Air intake holes 2511 are close to the second end 2312 of the first cylinder 231, and air outlet holes 2512 are close to the second end 2312. As shown in FIG. 8, the air intake holes 2511 are disposed on sidewall surfaces of the first piston 251, where the sidewall surfaces refer to two sidewall surfaces of the first piston 251 along a direction perpendicular to the first axis 201. The external gas can enter the air intake passage 2510 through the air intake hole 2511. The gas in the air intake passage 2510 can leave the air intake passage 2510 through the air outlet hole 2512 and enter the first cylinder cavity 2310. When the first piston 251 reciprocates along the direction of the first axis 201 in the first cylinder cavity 2310, the air intake hole 2511 can enter the third accommodating space

2113. In this case, the gas in the third accommodating space 2113 enters the air intake passage 2510 through the air intake hole 2511 and enters the first cylinder cavity 2310 through the air outlet hole 2512. When the first piston 251 leaves the third accommodating space 2113 and enters the first cylinder cavity 2310, the air intake hole 2511 can be covered and closed by the inner wall of the first cylinder 231, thereby preventing the gas from entering the air intake passage 2510 through the air intake hole 2511. In some examples, the air intake passage 2510 is specifically configured to have an L-shaped structure, and the air intake hole 2511 faces the inner wall of the first cylinder 231, that is, the air intake hole 2511 faces away from the first axis 201 and the air outlet hole 2512 faces the communication member 233.

In some examples, the inner diameter of the first cylinder 231 is 50 mm to 100 mm. Preferably, the inner diameter of the first cylinder 231 may be 55 mm, 60 mm, 90 mm, 93 mm, or 95 mm. In some examples, the length of the first cylinder 231 is 80 mm to 120 mm. Preferably, the length of the first cylinder 231 may be 82 mm, 85 mm, 90 mm, 111 mm, or 115 mm.

In some examples, the inner diameter of the second cylinder 232 is 20 mm to 50 mm. Preferably, the inner diameter of the second cylinder 232 may be 23 mm, 30 mm, 40 mm, 43 mm, or 45 mm. In some examples, the length of the second cylinder 232 is 80 mm to 150 mm. Preferably, the length of the second cylinder 232 may be 85 mm, 90 mm, 96 mm, 120 mm, 132 mm, or 140 mm.

Figure 9:
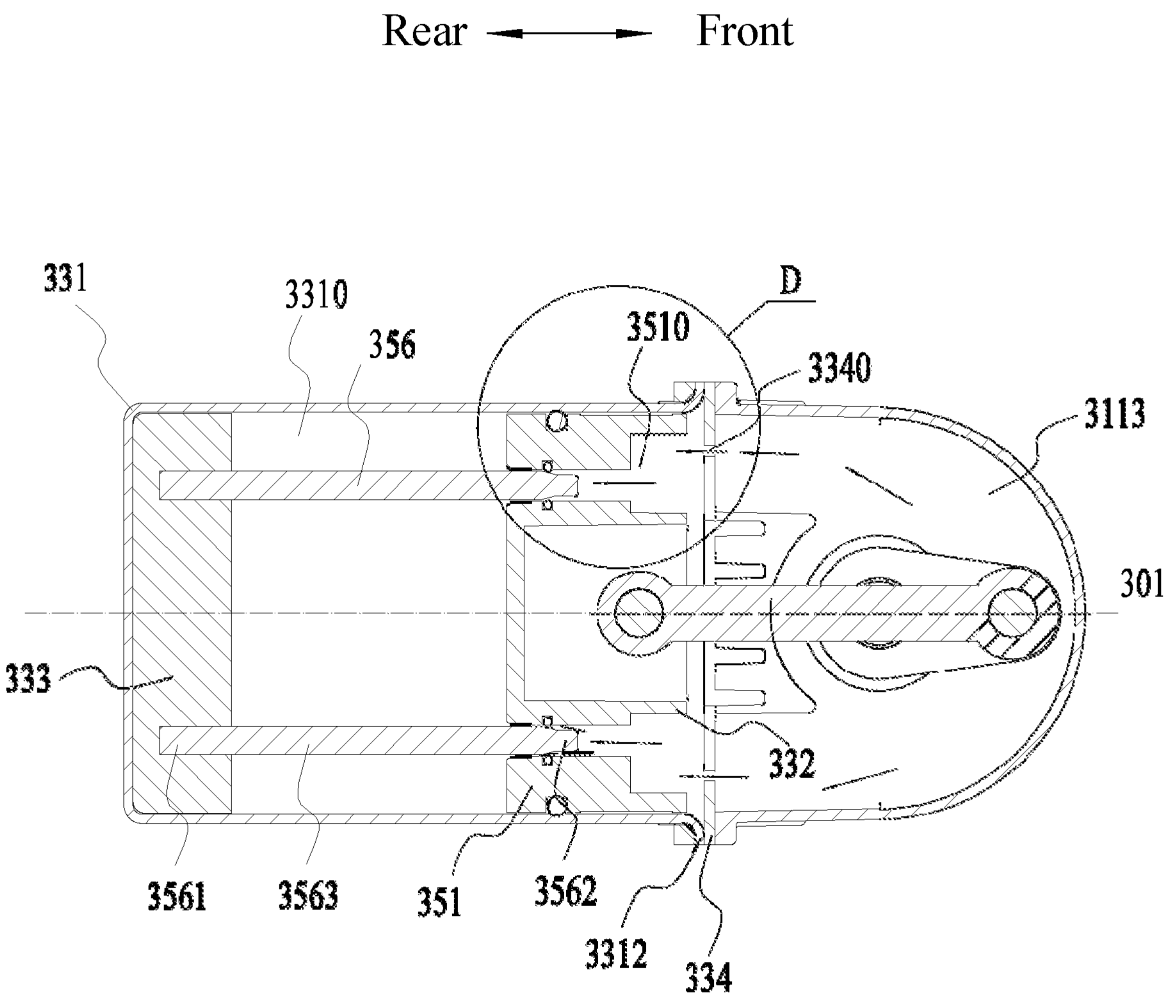
FIG. 9 is a sectional view of a partial structure of a nail gun according to an example of the present application.
Figure 10:
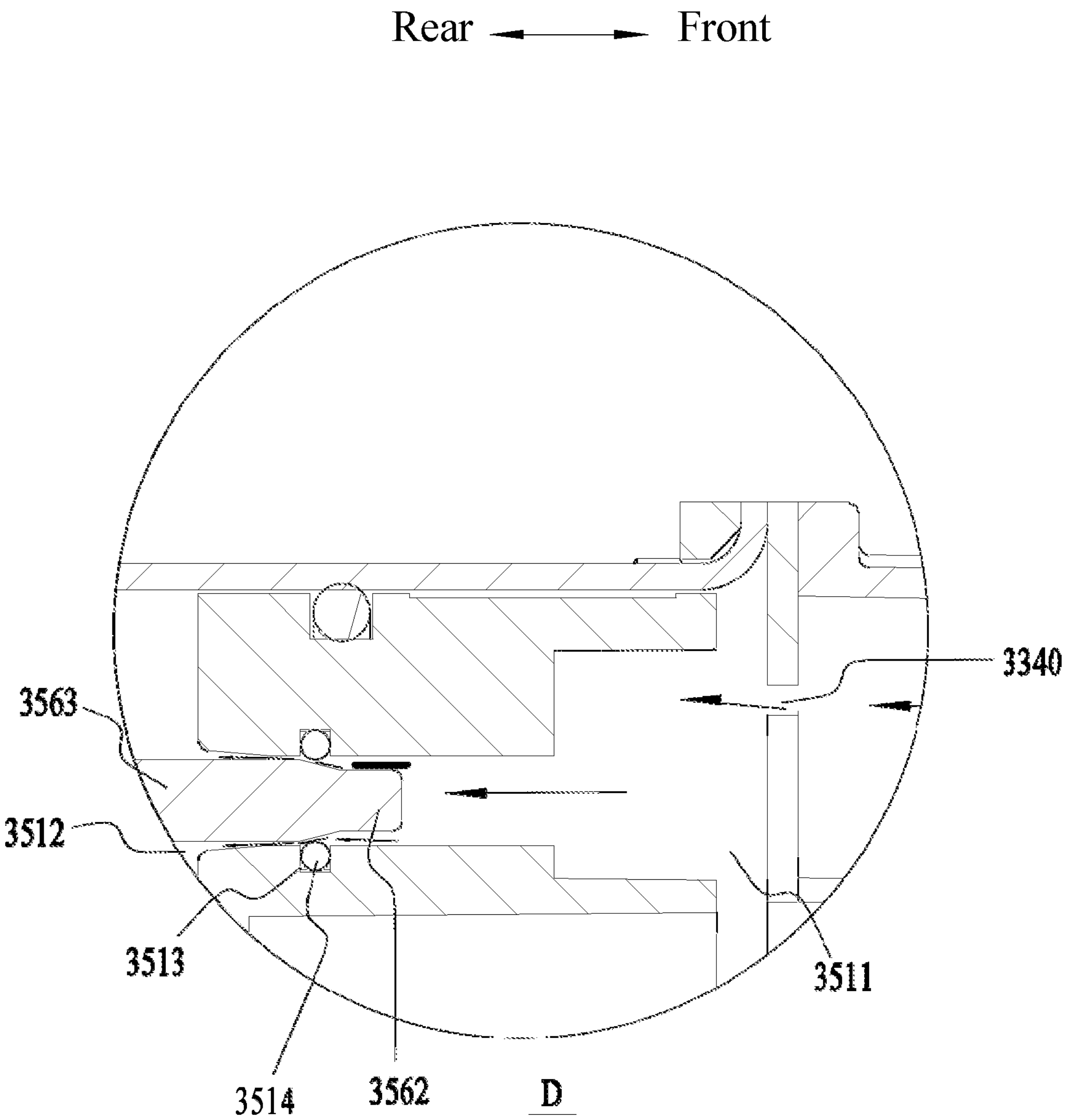
FIG. 10 is a partial enlarged view of a region D in FIG. 9.

As shown in FIGS. 9 and 10, as an optional third example of the cylinder assembly, the combination of a cylinder assembly 33 and a firing assembly 35 is provided by the present application. For ease of description, in this example, the difference between this example and the preceding example is mainly described, and the same reference numeral is used for a component which is the same as or similar to that in the preceding example. The content of the preceding example which is compatible with this example is applicable to this example.

The cylinder assembly 33 includes a first cylinder 331, a second cylinder 332, a communication member 333, and a stopper member 334. The stopper member 334 is disposed at a second end 3312 of the first cylinder 331 and can cover part of the first cylinder opening 2313, thereby preventing part or all of the first piston 351 from leaving the first cylinder cavity 3310. The stopper member 334 is provided with ventilation holes 3340 so that a gas in the third accommodating space 3113 is allowed to be capable of entering the first cylinder cavity 3310 through the ventilation holes 3340.

The first piston 351 includes insertion rod sealing members 3514. The air intake passage 3510 further includes fixed slots 3513, where a fixed slot 3513 can accommodate at least part of an insertion rod sealing member 3514, and the fixed slots 3513 are disposed between the air intake hole 3511 and the air outlet hole 3512.

The firing assembly 35 further includes insertion members 356, where an insertion member 356 can prevent the gas from entering the first cylinder cavity 3310 from the air outlet hole 3512. A first insertion end 3561 of the insertion member 356 is connected to the communication member 333. Specifically, the first insertion end 3561 may be configured to be inserted into the communication member 333. A second insertion end 3562 of the insertion member 356 can be inserted into the air intake passage 3510 through the air outlet hole 3512, thereby blocking the air intake passage 3510 to prevent the gas from entering the first cylinder cavity 3310 from the air outlet hole 3512. The insertion member 356 further includes an intermediate portion 3563 disposed between the first insertion end 3561 and the second insertion end 3562. The intermediate portion 3563 is configured to be capable of fitting closely around the insertion rod sealing member 3514 to prevent the gas from entering the first cylinder cavity 3310 through the air intake passage 3510.

In some examples, the diameter of the second insertion end 3562 is less than the diameter of the intermediate portion 3563, and the second insertion end 3562 cannot fit closely around the insertion rod sealing member 3514 so that the gas is allowed to enter the first cylinder cavity 3310 through the air intake passage 3510. The diameter of the air outlet hole 3512 may be greater than or equal to the diameter of the intermediate portion 3563. When the first piston 351 reciprocates along the direction of the first axis 301 in the first cylinder cavity 3310, the insertion member 356 which is fixedly connected to the communication member 333 also moves relative to the insertion rod sealing member 3514. When the second insertion end 3562 is inserted into the insertion rod sealing member 3514, a gap which allows the gas to pass through can be formed between the second insertion end 3562 and the insertion rod sealing member 3514. When the intermediate portion 3563 is inserted into the insertion rod sealing member 3514, the intermediate portion 3563 fits closely around the insertion rod sealing member 3514 so that it is difficult for the gas to pass through.

Figure 11:
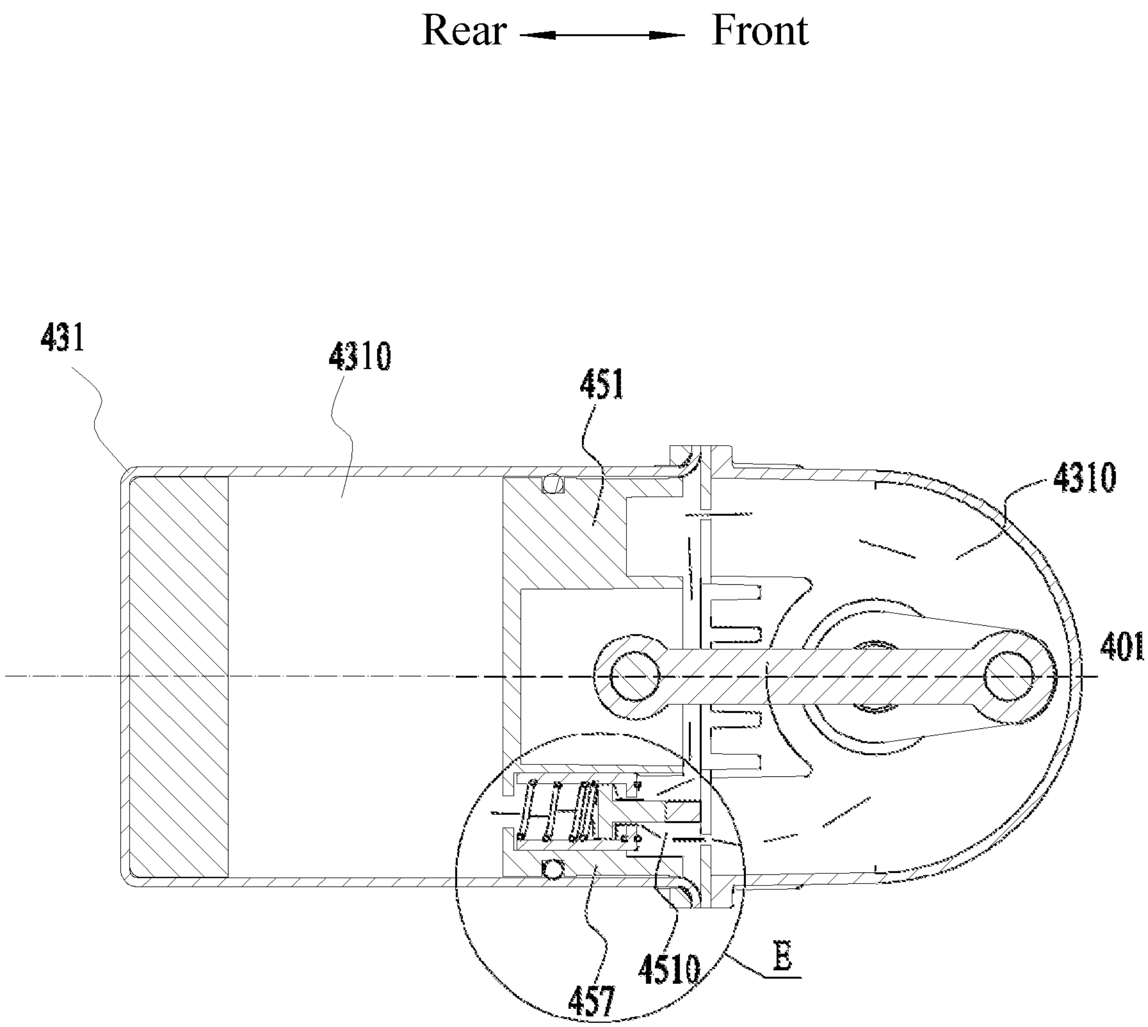
FIG. 11 is a sectional view of a partial structure of a nail gun according to an example of the present application.
Figure 12:
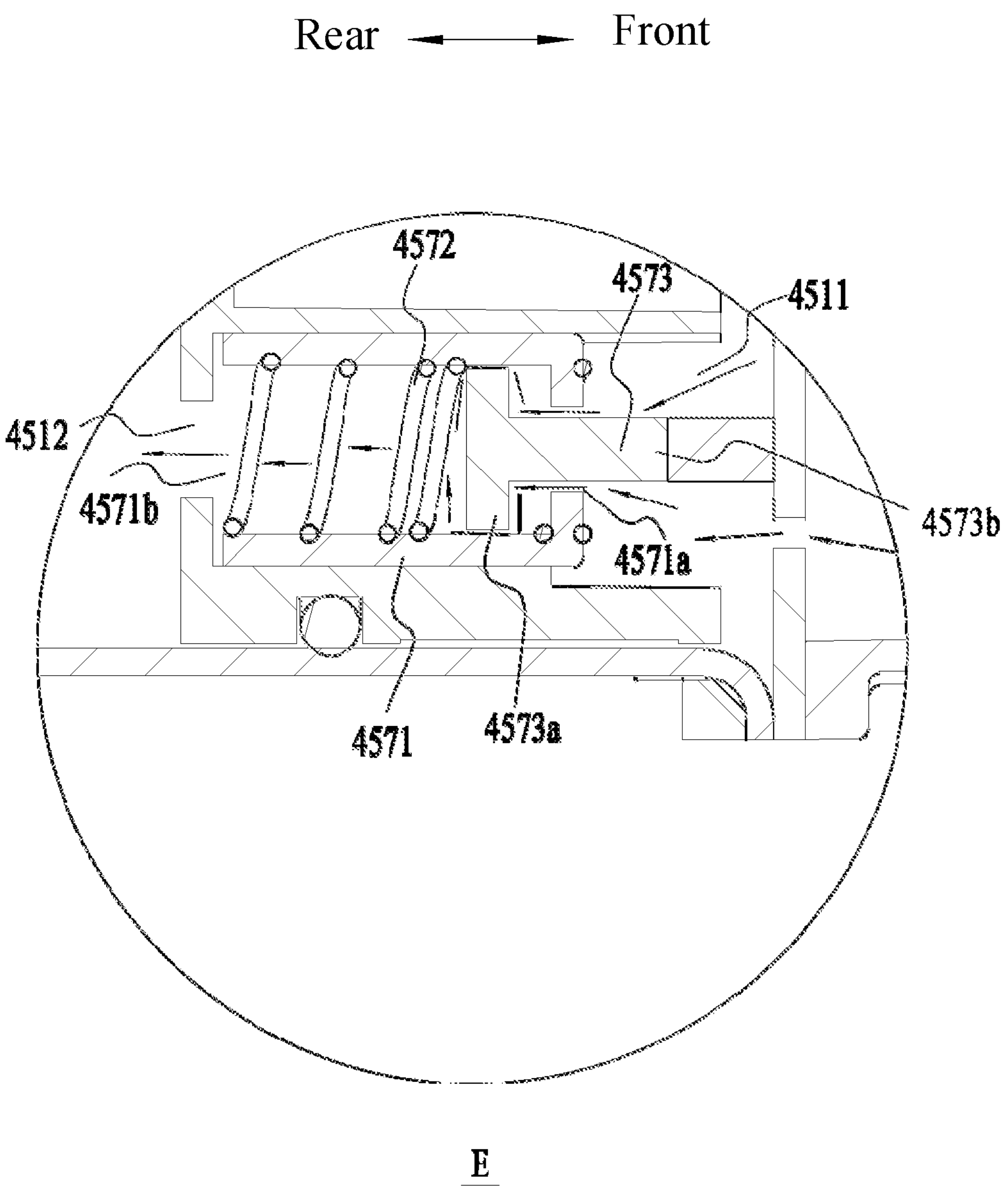
FIG. 12 is a partial enlarged view of a region E in FIG. 11.

As shown in FIGS. 11 and 12, as an optional fourth example of the cylinder assembly, the combination of a cylinder assembly 43 and a firing assembly 45 is provided by the present application. For ease of description, in this example, the difference between this example and the preceding example is mainly described, and the same reference numeral is used for a component which is the same as or similar to that in the preceding example. The content of the preceding example which is compatible with this example is applicable to this example.

The firing assembly 45 includes an air valve assembly 457 disposed in an air intake passage 4510. The air valve assembly 457 can allow a gas to enter a first cylinder cavity 4310 through the air intake passage 4510 and prevent the gas from entering the first cylinder cavity 4310 through the air intake passage 4510. Specifically, when a first piston 451 moves from rear to front to a first preset position (not marked in the figure) along the direction of a first axis 401 in the first cylinder cavity 4310, the air valve assembly 457 is open and allows the gas to enter the first cylinder cavity 4310 through the air intake passage 4510. When the first piston 451 moves from a second preset position (not marked in the figure) from front to rear along the direction of the first axis 401 in the first cylinder cavity 4310, the air valve assembly 457 is closed and prevents the gas to enter the first cylinder cavity 4310 through the air intake passage 4510.

In some examples, the air valve assembly 457 includes a valve body 4571, an elastic member 4572, and a switch member 4573. The elastic member 4572 is disposed in the valve body 4571 and abuts against a first switch end **4573*a* of the switch member 4573. Specifically, the elastic member 4572 may be a spring. The first switch end 4573*a* of the switch member 4573 is disposed in the valve body 4571, and a second switch end 4573*b* of the switch member 4573 is fixedly connected to the stopper member 334. The valve body 4571 includes a first opening 4571*a* and a second opening 4571*b*, where the first opening 4571*a* is close to an air intake port 4511, and the second opening 4571*b* is close to an air outlet port 4512. The first switch end 4573*a* can close the first opening 4571*a* under the pressure of the elastic member 4572 to prevent the gas from entering the valve body 4571 through the first opening 4571***a*.

Figure 13:
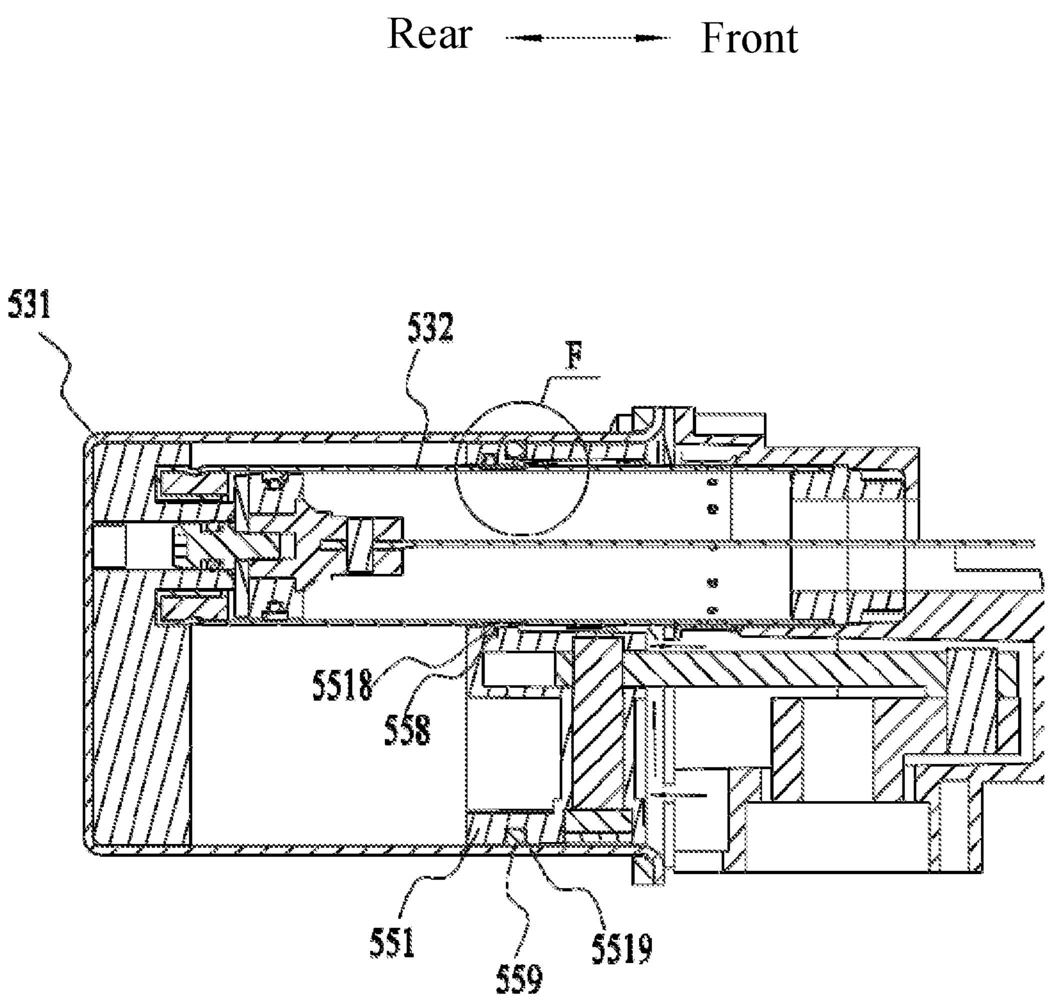
FIG. 13 is a sectional view of a partial structure of a nail gun according to an example of the present application.
Figure 14:
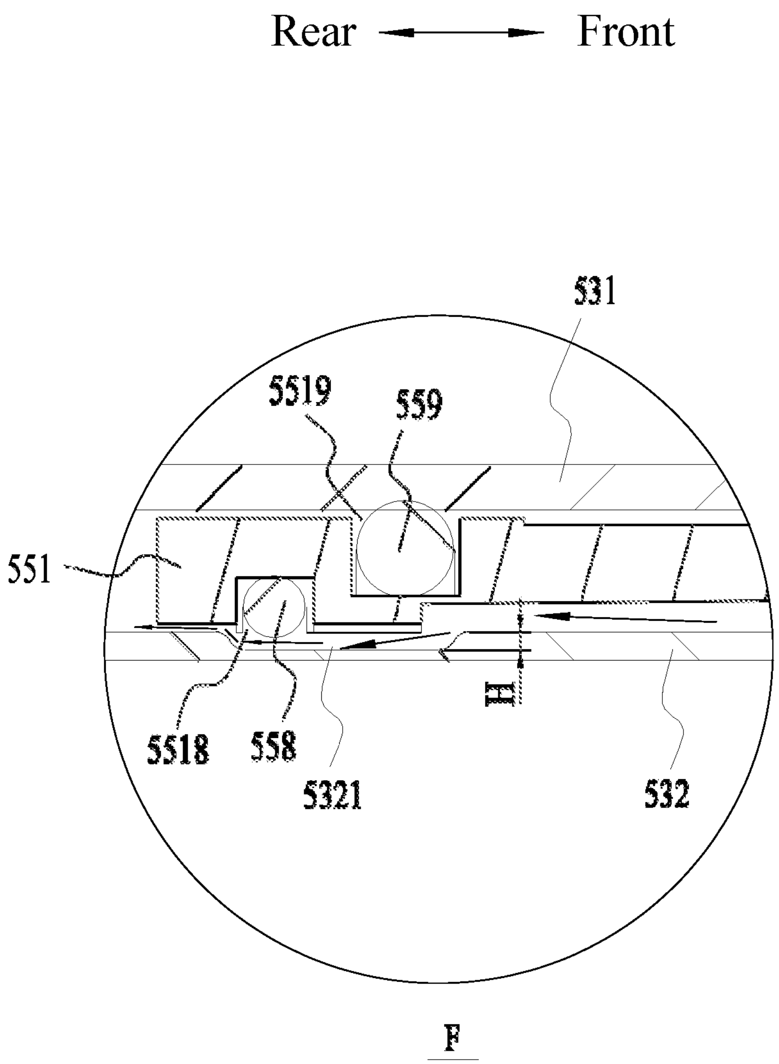
FIG. 14 is a partial enlarged view of a region F in FIG. 13.
Figure 15:
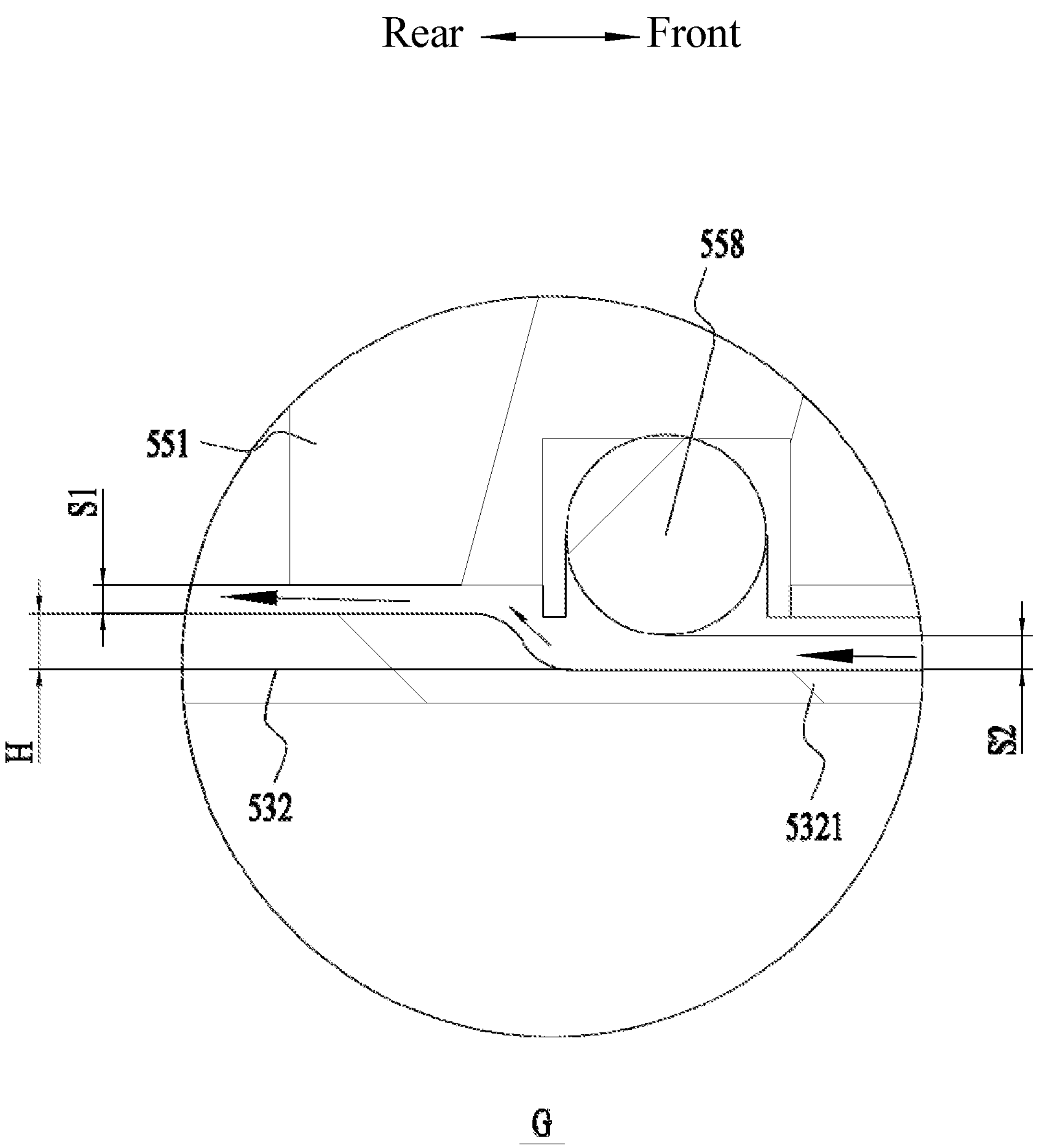
FIG. 15 is a partial enlarged view of a region G in FIG. 14.
Figure 16:
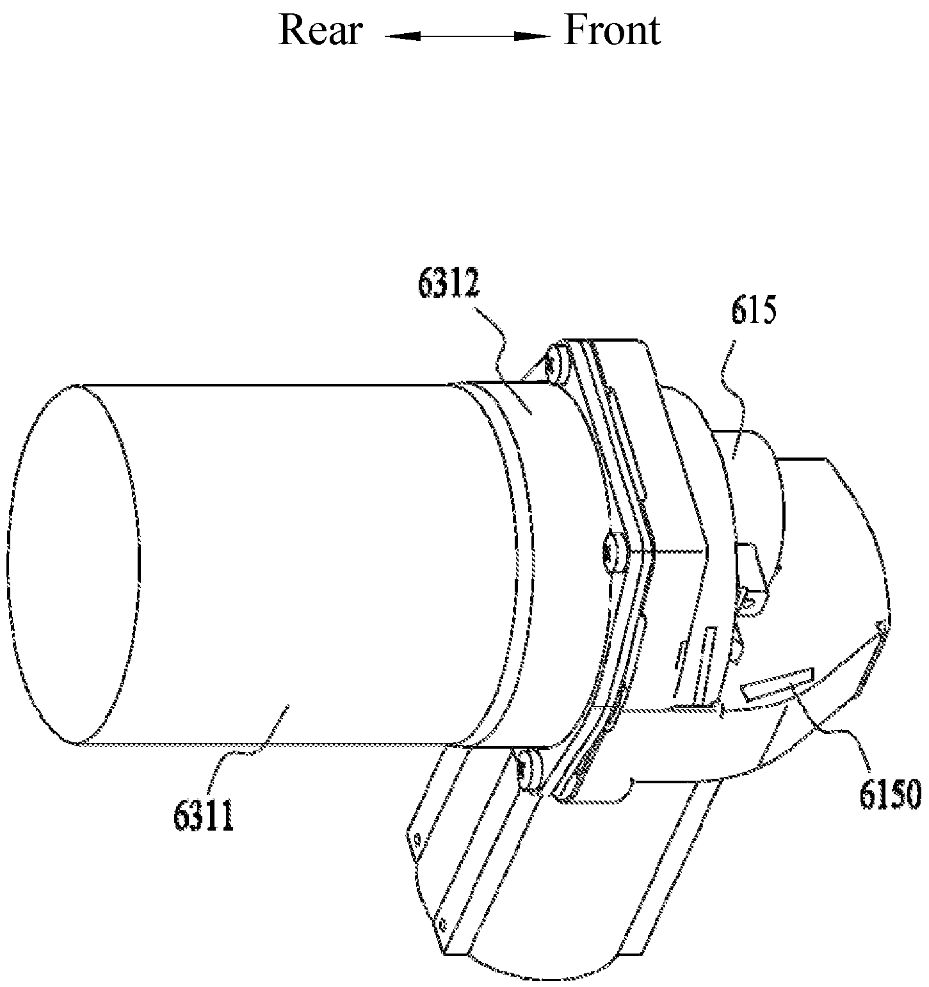
FIG. 16 is a perspective view of a partial structure of a nail gun according to an example of the present application.
Figure 17:
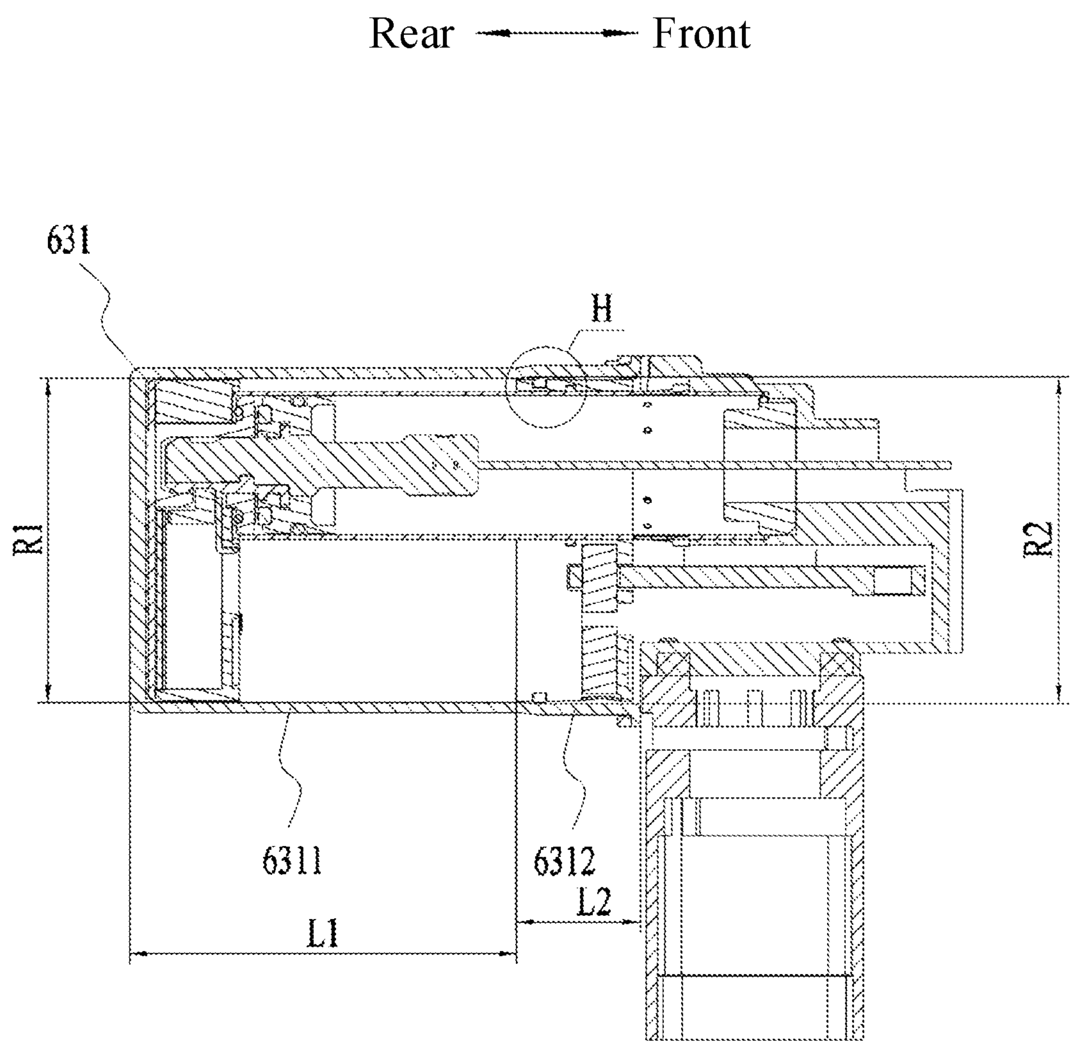
FIG. 17 is a sectional view of the partial structure of the nail gun in FIG. 6 from an angle of view.
Figure 18:
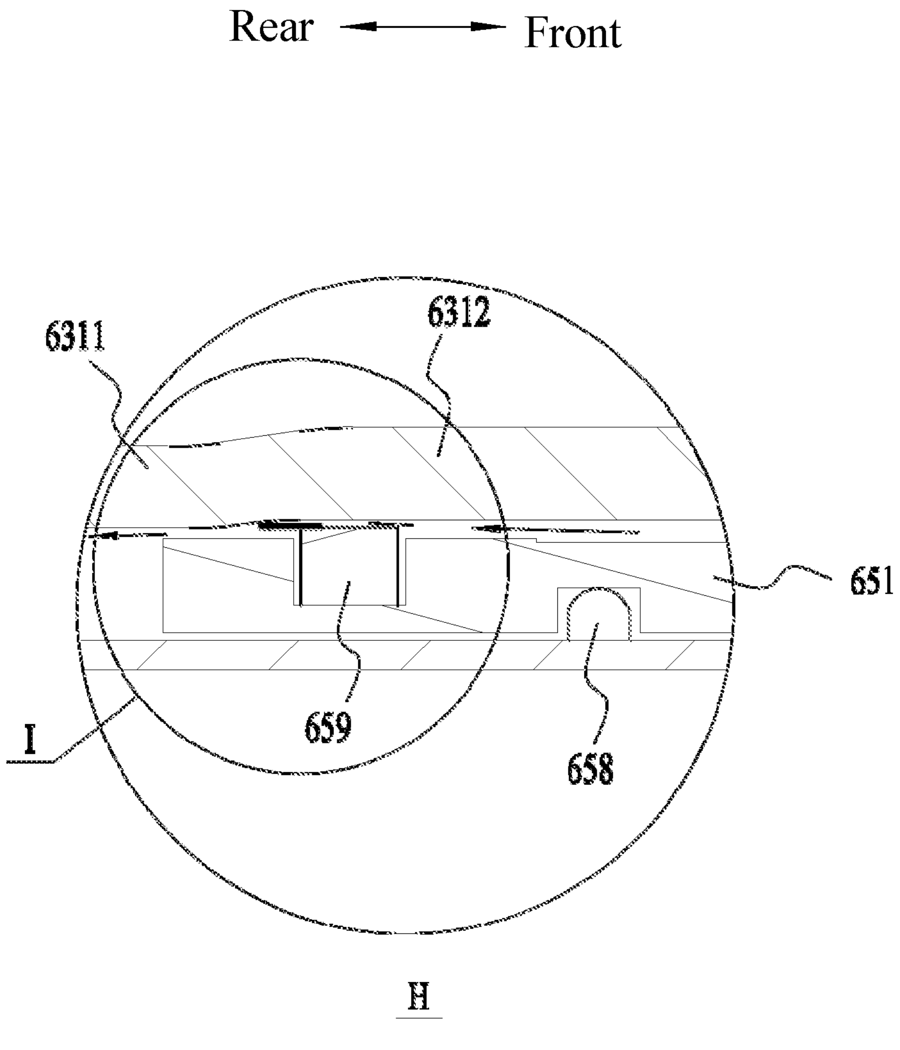
FIG. 18 is a partial enlarged view of a region H in FIG. 17.

As shown in FIGS. 13 to 15, as an optional fifth example of the cylinder assembly, the combination of a cylinder assembly 53 and a firing assembly 55 is provided by the present application. For ease of description, in this example, the difference between this example and the preceding example is mainly described, and the same reference numeral is used for a component which is the same as or similar to that in the preceding example. The content of the preceding example which is compatible with this example is applicable to this example.

The firing assembly 55 includes a first sealing member 558 and a second sealing member 559. The first sealing member 558 surrounds the outer wall of a second cylinder 532, where the outer side of the first sealing member 558 fits snugly around a first piston 551, and the inner side of the first sealing member 558 fits snugly around part of the outer wall of the second cylinder 532. The first piston 551 can drive the first sealing member 558 to move on the surface of the outer wall of the second cylinder 532. It is to be understood that the surface of the outer wall for the first piston 551 and the first sealing member 558 to slide on refers to the cylindrical outer wall of the second cylinder 532 along the length direction of the second cylinder 532. The second sealing member 559 surrounds the outer wall of the first piston 551, where the inner side of the second sealing member 559 fits snugly around the first piston 551, and the outer side of the second sealing member 559 is capable of fitting snugly around the inner wall of the first cylinder 531. The first piston 551 can drive the second sealing member 559 to slide on the surface of the inner wall of the first cylinder 531.

The first piston 551 is provided with a first accommodating groove 5518 and a second accommodating groove 5519. The first accommodating groove 5518 is used for accommodating at least part of the first sealing member 558, and the opening of the first accommodating groove 5518 faces the inner wall of the first cylinder 531. The second accommodating groove 5519 is used for accommodating at least part of the second sealing member 559, and the opening of the second accommodating groove 5519 faces the outer wall of the second cylinder 532.

Slots 5321 are disposed on part of the surface of the outer wall of the second cylinder 532. When the first piston 551 drives the first sealing member 558 to move to the position of a slot 5321, the first sealing member 558 cannot continue fitting closely around the surface of the outer wall of the second cylinder 532 due to the existence of the slot 5321. Therefore, an air intake passage is formed at the position of the slot 5321 between the first piston 551 and the surface of the outer wall of the second cylinder 532, and a gas can pass through the air intake passage. Distances between the first sealing member 558 and the surface of the outer wall of the second cylinder 532 are different from each other. When the first sealing member 558 moves to the part of the surface of the outer wall, that is, the position of the slot 5321 in this example, the distance between the first sealing member 558 and the surface of the outer wall is greater than 0. When the first sealing member 558 moves to part of the surface of the outer wall, that is, the surface of the normal cylindrical outer wall in this example, the distance between the first sealing member 558 and the surface of the outer wall is 0. Thus, when the first sealing member 558 moves to the part of the surface of the outer wall, the gas can pass through the air intake passage because the distance between the first sealing member 558 and the surface of the outer wall is greater than 0. When the first sealing member 558 moves to the part of the surface of the outer wall, the air intake passage is closed and the first sealing member 558 prevents the gas from passing between the first piston 551 and the surface of the outer wall since the distance between the first sealing member 558 and the surface of the outer wall is 0.

As shown in FIG. 15, when the first sealing member 558 is located in the slot 5321, a minimum gap between the first piston 551 and the surface of the outer wall of the second cylinder 532 is S1, and a spacing between the first sealing member 558 and the surface of the outer wall of the second cylinder 532 is S2. In some examples, S2 is set to be greater than S1 so that it can be ensured that the air intake volume of the cylinder assembly 53 meets the requirement of the nail gun for continuously shooting nails.

In some examples, the depth H of the slot 5321 may be 1 mm to 5 mm. In some examples, at least two slots 5321 are disposed on part of the surface of the outer wall of the second cylinder 532. All of the slots 5321 may be symmetrically disposed around the second axis 502.

As shown in FIGS. 16 to 19, as an optional sixth example of the cylinder assembly, the combination of a cylinder assembly 63 and a firing assembly 65 is provided by the present application. For ease of description, in this example, the difference between this example and the preceding example is mainly described, and the same reference numeral is used for a component which is the same as or similar to that in the preceding example. The content of the preceding example which is compatible with this example is applicable to this example.

In this example, a first cylinder 631 includes a first rear cylinder body 6311 and a first front cylinder body 6312, where the inner diameter R2 of the first front cylinder body 6312 is greater than the inner diameter R1 of the first rear cylinder body 6311. The first rear cylinder body 6311 is located behind the first front cylinder body 6312. In another example, the first rear cylinder body 6311 may be located in front of the first front cylinder body 6312.

The first cylinder cavity 6310 includes the cavity of the first rear cylinder body 6311 and the cavity of the first front cylinder body 6312. Specifically, the outer diameter of the first front cylinder body 6312 is also greater than the outer diameter of the first rear cylinder body 6311, or the maximum inner diameter of the first front cylinder body 6312 is greater than the minimum inner diameter of the first rear cylinder body 6311. In some examples, the first cylinder 631 further includes a transition section (not marked in the figure) disposed in the first rear cylinder body 6311 and the first front cylinder body 6312.

When a first piston 651 drives a second sealing member 659 to move to the cavity of the first rear cylinder body 6311, the second sealing member 659 fits closely around the surface of the inner wall of the first rear cylinder body 6311. When the first piston 651 drives the second sealing member 659 to move into the cavity of the first front cylinder body 6312, the second sealing member 659 cannot continue fitting closely around the surface of the inner wall of the first rear cylinder body 6311. Therefore, an air intake passage is formed between the first piston 651 and the surface of the inner wall of the first rear cylinder body 6311 or the surface of the inner wall of the first front cylinder body 6312 in the cavity of the first front cylinder body 6312, and a gas can pass through the air intake passage.

Figure 19:
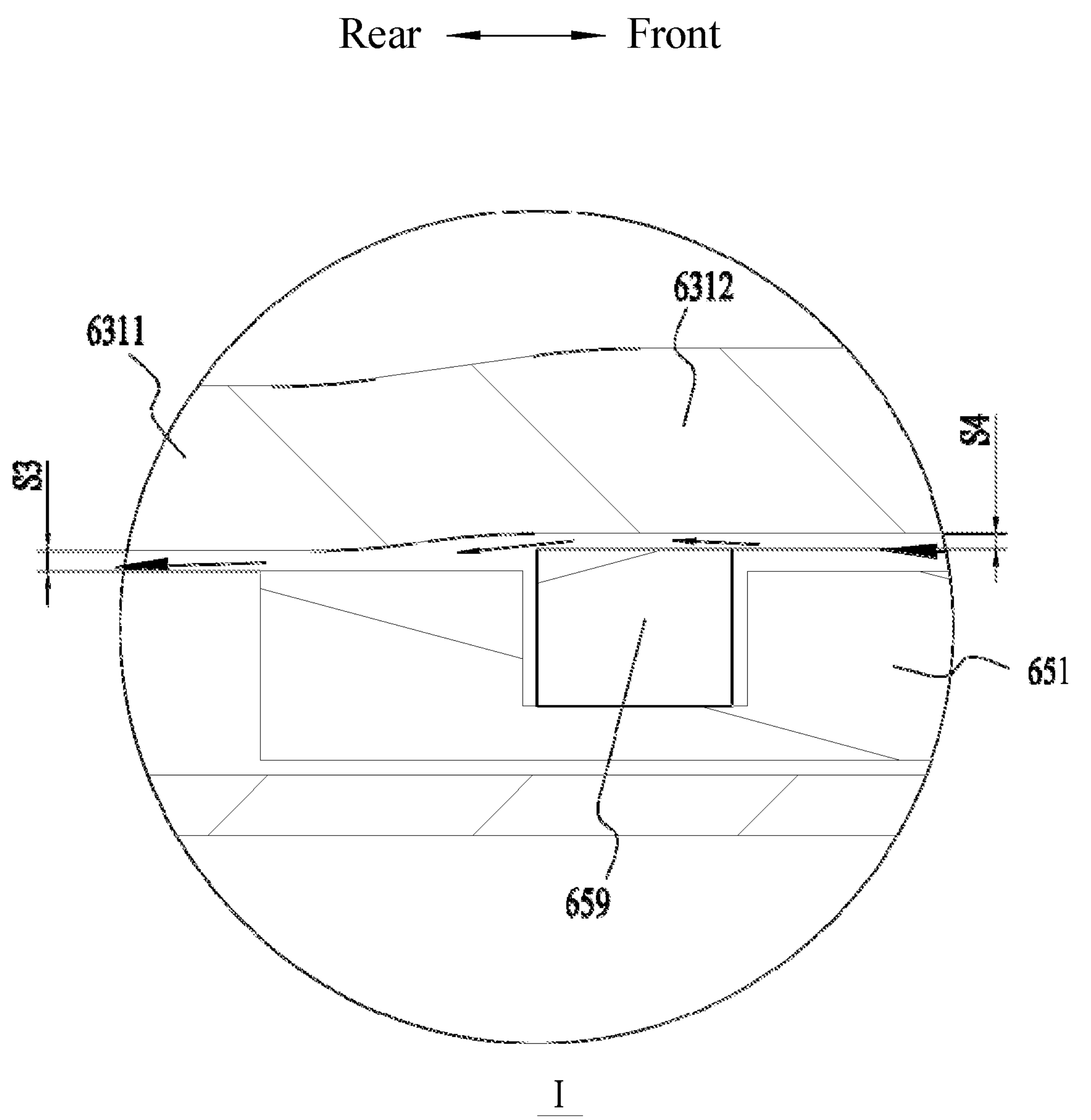
FIG. 19 is a partial enlarged view of a region I in FIG. 18.

As shown in FIG. 19, when the second sealing member 659 is located in the cavity of the first front cylinder body 6312, a gap between the first piston 651 and the surface of the inner wall of the first rear cylinder body 6311 is S3, and a gap distance between the second sealing member 659 and the surface of the inner wall of the first front cylinder body 6312 is S4. In some examples, S4 is set to be greater than S3 so that it can be ensured that the air intake volume of the cylinder assembly 63 meets the requirement of the nail gun for continuously shooting nails.

In some examples, the difference between the inner diameter of the first rear cylinder body 6311 and the inner diameter of the first front cylinder body 6312 is 0.5 mm to 15 mm. Preferably, the difference between the inner diameter of the first rear cylinder body 6311 and the inner diameter of the first front cylinder body 6312 may be 1 mm, 2 mm, or 5 mm. In some examples, the inner diameter R1 of the first rear cylinder body 6311 may range from 30 mm to 150 mm. Preferably, the inner diameter R1 of the first rear cylinder body 6311 may be 50 mm, 60 mm, or 70 mm. In some examples, the inner diameter R2 of the first front cylinder body 6312 may range from 32 mm to 165 mm. Preferably, the inner diameter R2 of the first front cylinder body 6312 may be 35 mm, 65 mm, or 75 mm.

In some examples, the difference between the length of the first rear cylinder body 6311 and the length of the first front cylinder body 6312 is 10 mm to 50 mm. Preferably, the difference between the length of the first rear cylinder body 6311 and the length of the first front cylinder body 6312 may be 10 mm, 15 mm, or 30 mm. In some examples, the length L1 of the first rear cylinder body 6311 may range from 55 mm to 80 mm. Preferably, the length L1 of the first rear cylinder body 6311 may be 60 mm, 65 mm, or 70 mm. In some examples, the length L2 of the first front cylinder body 6312 may range from 25 mm to 75 mm. Preferably, the length L2 of the first front cylinder body 6312 may be 30 mm, 40 mm, or 50 mm. Optionally, the length L2 of the first front cylinder body 6312 may be equal to or similar to the length of the first piston 651.

In some examples, the mounting base 615 includes an air intake opening 6150, and an external gas outside the cylinder assembly 63 can enter a first accommodating space 611 through the air intake opening 6150 so that a sufficient air intake volume is provided for the cylinder assembly 63.

In all the preceding examples, all of the sealing members, such as the insertion rod sealing member 3514, the first sealing member, and the second sealing member, may be sealing rings. Specifically, all of the sealing members may be O-shaped sealing rings, where the process of an O-shaped sealing ring is mature and the price of the O-shaped sealing ring is low. Alternatively, all of the sealing members, such as the insertion rod sealing member 3514, the first sealing member, and the second sealing member, may be X-shaped sealing rings, where an X-shaped sealing ring has excellent sealing performance.

The basic principles, main features, and advantages of the present application are shown and described above. It is to be understood by those skilled in the art that the preceding examples do not limit the present application in any form, and all technical solutions obtained through equivalent substitutions or equivalent transformations fall within the scope of the present application.

What is claimed is:

1. A nail gun, comprising:

a housing formed with an accommodating space;

a cylinder assembly at least partially disposed in the housing;

a magazine assembly storing nails;

a firing assembly for striking a nail and at least partially disposed in the cylinder assembly, wherein the cylinder assembly comprises a first cylinder and a second cylinder, the first cylinder comprises a first cylinder cavity extending along a direction of a first axis, and at least part of the second cylinder is disposed in the first cylinder cavity; and a first piston, wherein at least part of the first piston is disposed in the first cylinder cavity, the first piston is capable of reciprocating along the direction of the first axis in the first cylinder cavity, the first piston is configured to be capable of forming an air intake passage with part of an outer wall of the second cylinder, and a gas is capable of passing through the air intake passage and entering the first cylinder cavity, and a first sealing member is driven by the first piston to move on a surface of the outer wall of the second cylinder.

2. The nail gun according to claim 1, wherein an outer side of the first sealing member fits snugly around the first piston, an inner side of the first sealing member fits snugly around part of the outer wall of the second cylinder, a slot is disposed on part of the surface of the outer wall of the second cylinder, and the second cylinder is configured such that, when the first sealing member is located in the slot, the air intake passage is formed between the first piston and the surface of the outer wall of the second cylinder and the gas is capable of passing through the air intake passage.

3. The nail gun according to claim 2, wherein the first piston is provided with a first accommodating groove for accommodating part of the first sealing member.

4. The nail gun according to claim 2, wherein the firing assembly further comprises a second sealing member, an inner side of the second sealing member fits snugly around the first piston, an outer side of the second sealing member is capable of fitting snugly around an inner wall of the first cylinder, the first piston is capable of driving the second sealing member to slide on a surface of the inner wall of the first cylinder, and the first cylinder is configured such that, when the first sealing member moves to a position of the slot, the first sealing member forms part of the air intake passage with the surface of the outer wall of the second cylinder.

5. The nail gun according to claim 4, wherein the first piston is provided with a second accommodating groove for accommodating part of the second sealing member.

6. The nail gun according to claim 4, wherein the first sealing member and/or the second sealing member are O-shaped sealing rings.

7. The nail gun according to claim 4, wherein the first sealing member and/or the second sealing member are X-shaped sealing rings.

8. The nail gun according to claim 2, wherein the second cylinder comprises a second cylinder cavity extending along a direction of a second axis, wherein the first axis is parallel to the second axis, the firing assembly comprises a second piston disposed in the second cylinder cavity, and the second piston is capable of reciprocating along the direction of the second axis in the second cylinder cavity.

9. The nail gun according to claim 2, wherein a depth of the slot is 1 mm to 5 mm.

10. The nail gun according to claim 8, wherein at least two slots are disposed on part of the surface of the outer wall of the second cylinder.

11. The nail gun according to claim 10, wherein all of the slots are symmetrically disposed around the second axis.

12. The nail gun according to claim 2, wherein when the first sealing member is located in the slot, a spacing between the first sealing member and the surface of the outer wall of the second cylinder is greater than a minimum gap between the first piston and the surface of the outer wall of the second cylinder.

13. The nail gun according to claim 1, wherein the first piston is provided with the air intake passage, and an external gas outside the cylinder assembly is capable of entering the first cylinder cavity through the air intake passage.

14. The nail gun according to claim 13, wherein the air intake passage comprises an air intake hole, the external gas is capable of entering the air intake passage through the air intake hole, and the air intake hole is disposed on a sidewall surface of the first piston.

15. The nail gun according to claim 1, wherein the first cylinder comprises a first rear cylinder body and a first front cylinder body, the firing assembly comprises a second sealing member, an inner side of the second sealing member fits snugly around the first piston, an outer side of the second sealing member is capable of fitting snugly around an inner wall of the first rear cylinder body, the first cylinder is configured such that the first piston forms an air intake passage with a surface of the inner wall of the first rear cylinder body and the gas is capable of passing through the air intake passage when the second sealing member is located in a cavity of the first front cylinder body, and the second sealing member abuts against the surface of the inner wall of the first rear cylinder body when the second sealing member is located in a cavity of the first rear cylinder body.

16. A nail gun, comprising:

a housing formed with an accommodating space;

a cylinder assembly at least partially disposed in the housing;

a magazine assembly for storing nails;

a firing assembly used for striking a nail and at least partially disposed in the cylinder assembly, wherein the cylinder assembly comprises a first cylinder and a second cylinder, the first cylinder comprises a first cylinder cavity extending along a direction of a first axis, and at least part of the second cylinder is disposed in the first cylinder cavity;

a first piston, wherein at least part of the first piston is disposed in the first cylinder cavity, and the first piston is capable of reciprocating along the direction of the first axis in the first cylinder cavity; and a first sealing member, wherein an outer side of the first sealing member fits snugly around the first piston, an inner side of the first sealing member fits snugly around part of an outer wall of the second cylinder, the first piston is capable of driving the first sealing member to move on a surface of the outer wall of the second cylinder, and distances between the first sealing member and the surface of the outer wall of the second cylinder are different from each other.

17. The nail gun according to claim 16, wherein, in a radial direction, a distance between the first sealing member and part of the surface of the outer wall of the second cylinder is 0, and a distance between the first sealing member and part of the surface of the outer wall of the second cylinder is greater than 0.

18. The nail gun according to claim 16, wherein, in a radial direction, a slot is disposed on part of the surface of the outer wall of the second cylinder, and a distance between the first sealing member and the slot of the second cylinder is greater than 0.

19. The nail gun according to claim 18, wherein a spacing between the first sealing member and the surface of the outer wall of the second cylinder is greater than a minimum gap between the first piston and the surface of the outer wall of the second cylinder.

20. The nail gun according to claim 16, wherein the first piston is configured to be capable of forming an air intake passage with part of the outer wall of the second cylinder, and a gas is capable of passing through the air intake passage and entering the first cylinder cavity.

* * * * *